(12) United States Patent
Lee

(10) Patent No.: US 7,525,738 B2
(45) Date of Patent: Apr. 28, 2009

(54) LENS SYSTEM

(75) Inventor: Chieh-jen Lee, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 206 days.

(21) Appl. No.: 11/398,517

(22) Filed: Apr. 5, 2006

(65) Prior Publication Data
US 2006/0274429 A1    Dec. 7, 2006

(30) Foreign Application Priority Data
Jun. 2, 2005    (TW) ............................... 94118266 A

(51) Int. Cl.
  G02B 15/14    (2006.01)
  G02B 13/18    (2006.01)
(52) U.S. Cl. ..................... 359/689; 359/680; 359/708
(58) Field of Classification Search ................. 359/689, 359/680–682
See application file for complete search history.

(56) References Cited

U.S. PATENT DOCUMENTS

| | | | |
|---|---|---|---|
| 5,434,710 A | 7/1995 | Zozawa | |
| 5,745,301 A * | 4/1998 | Betensky et al. | 359/689 |
| 5,986,818 A * | 11/1999 | Hashimura | 359/653 |
| 6,124,984 A | 9/2000 | Shibayama et al. | |
| 7,336,427 B2 * | 2/2008 | Lee et al. | 359/686 |
| 2003/0012567 A1 | 1/2003 | Itoh | |
| 2005/0231818 A1* | 10/2005 | Matsusaka | 359/680 |
| 2005/0248854 A1* | 11/2005 | Takeuchi | 359/680 |
| 2005/0259333 A1* | 11/2005 | Matsusaka | 359/680 |
| 2005/0286138 A1* | 12/2005 | Matsusaka | 359/680 |

* cited by examiner

Primary Examiner—Jordan M. Schwartz

(57) ABSTRACT

A lens system includes, in sequence from an object side to an image side, a first lens group having negative refractive power; a second lens group having positive refractive power, which includes a composite lens with aspheric resin layers formed on object side and image side thereof, respectively; and a third lens group having positive refractive power. In zooming, the first lens group remains stationary and when performing from the wide-angle end to the telephoto end, the second lens group moves away from the image plane, while the third lens group moves toward the image plane, whereby the distance between the first and second lens groups is decreased, while the distance between the second and third lens groups is increased.

17 Claims, 48 Drawing Sheets spherical aberration and off-axis chromatic aberration coma aberration coma aberration image height:1.6800 mm
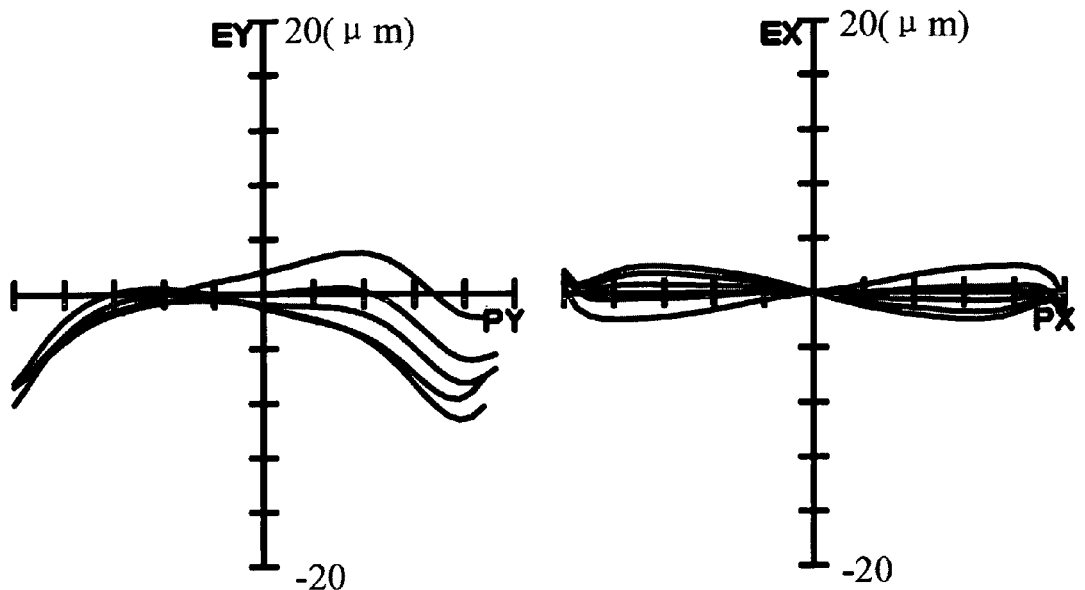
image height:2.5200 mm
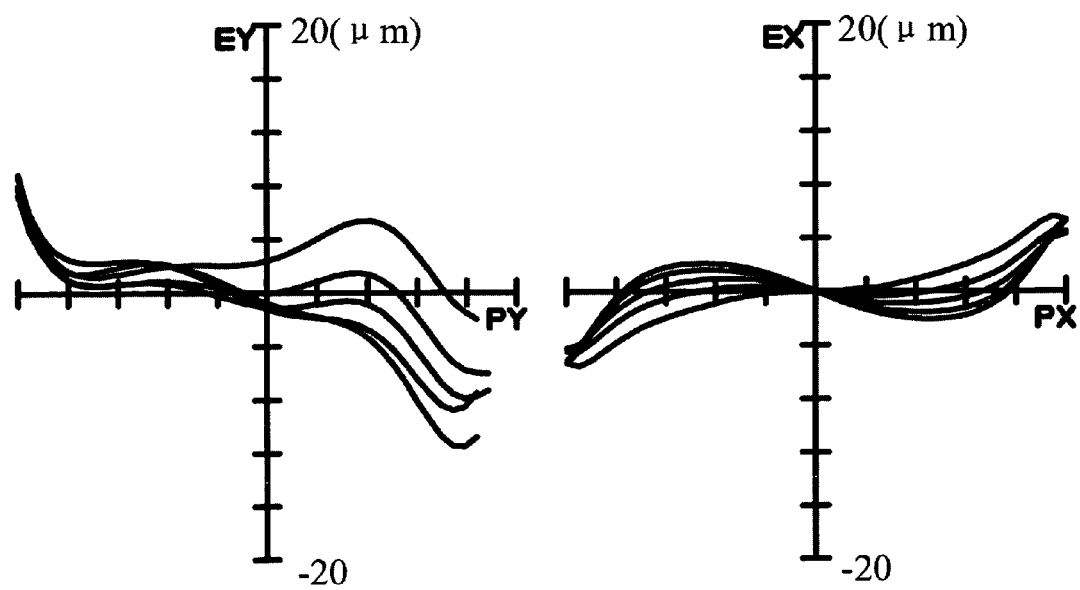
coma aberration
Fig. 2c-3

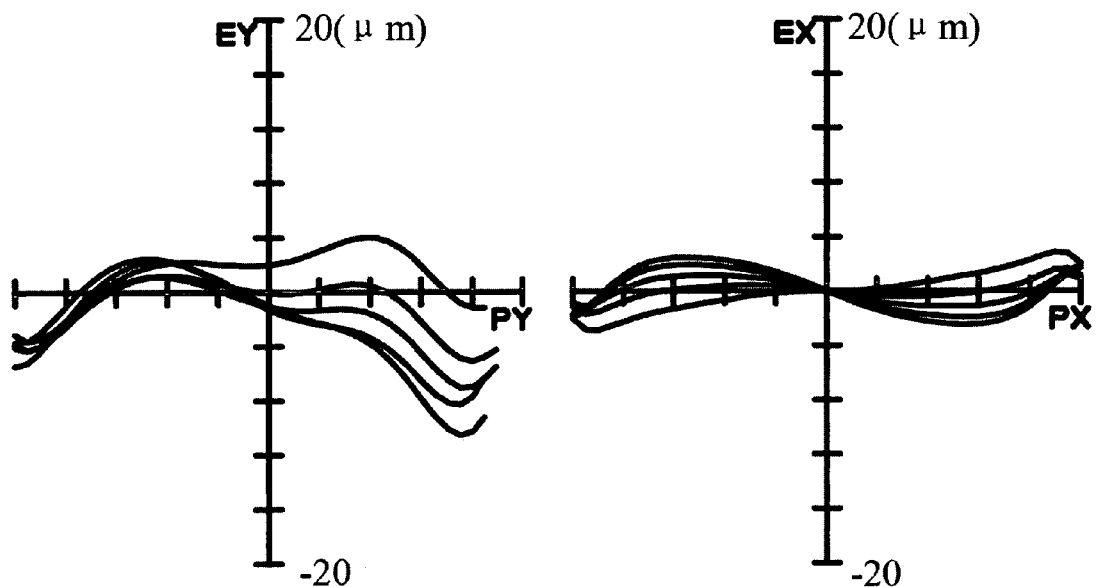
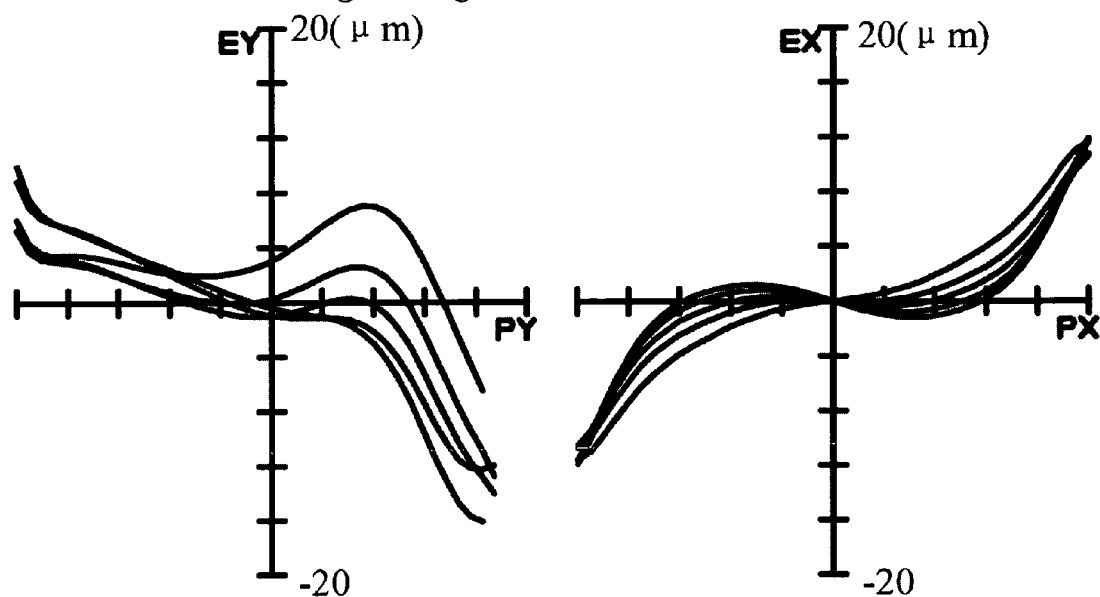
coma aberration
Fig. 2c-4 spherical aberration and off-axis chromatic aberration astigmatism abberration          distortion aberration image height coma aberration image height: 0.2800 mm image height: 1.1200 mm coma aberration coma aberration

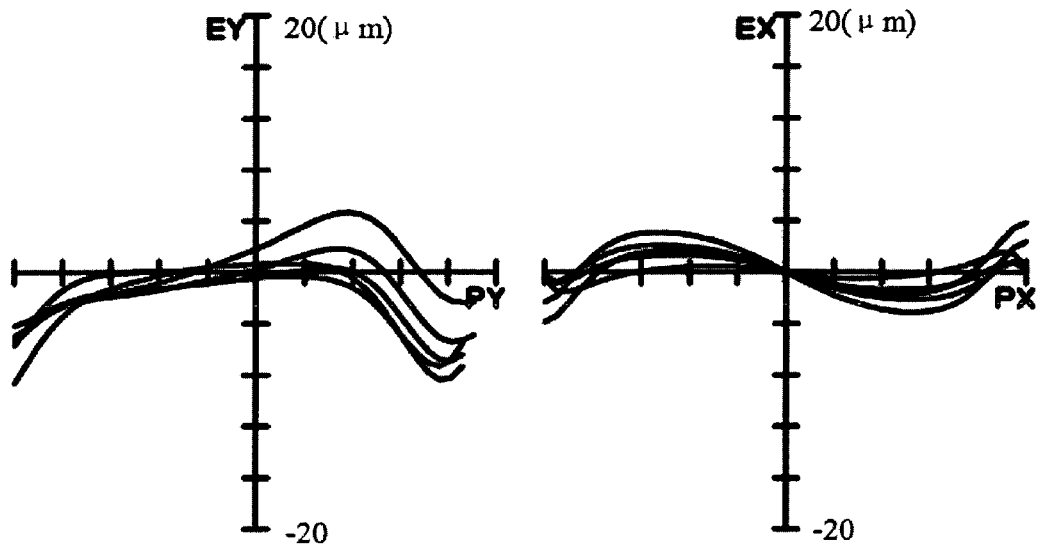
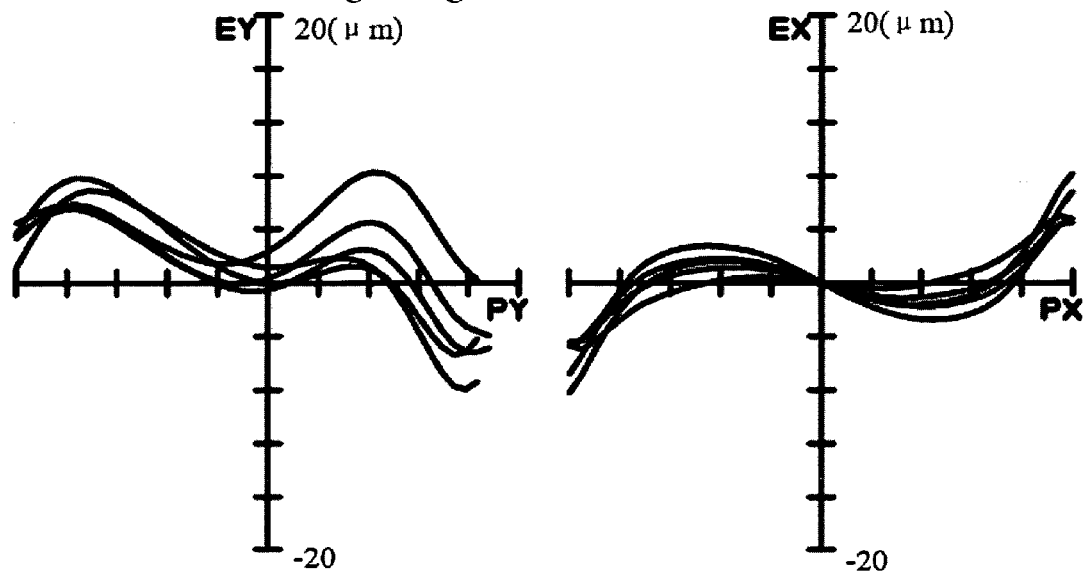
coma aberration
Fig. 3c-4 spherical aberration and off-axis chromatic aberration astigmatism abberration  distortion aberration image height coma aberration coma aberration coma aberration coma aberration spherical aberration and off-axis chromatic aberration astigmatism abberration                distortion aberration image height coma aberration coma aberration image height: 1.6800 mm image height: 2.5200 mm coma aberration coma aberration spherical aberration and off-axis chromatic aberration astigmatism abberration distortion aberration image height coma aberration coma aberration coma aberration image height: 2.2400 mm image height: 2.8500 mm coma aberration spherical aberration and off-axis chromatic aberration astigmatism abberration distortion aberration coma aberration coma aberration coma aberration coma aberration spherical aberration and off-axis chromatic aberration astigmatism abberration      distortion aberration image height coma aberration image height: 0.2800 mm image height: 1.1200 mm coma aberration coma aberration coma aberration spherical aberration and off-axis chromatic aberration astigmatism abberration · · · · · · · · · · · · distortion aberration image height coma aberration coma aberration coma aberration coma aberration spherical aberration and off-axis chromatic aberration astigmatism abberration    distortion aberration image height coma aberration image height: 0.2800 mm image height: 1.1200 mm coma aberration image height: 1.6800 mm image height: 2.5200 mm coma aberration image height: 2.2400 mm image height: 2.8500 mm coma aberration

LENS SYSTEM

BACKGROUND OF THE INVENTION

1. Field of the Invention

The present invention relates generally to a lens system, and more particularly to a compact lens system for digital imaging products, such as a mobile phone.

2. Description of the Prior Art

With the development of multi-media technology, digital imaging devices, such as digital cameras and mobile phones that can be used to take pictures, have been widely accepted by consumers. Such devices are equipped with image sensing devices, such as charge-coupled devices (CCDs) and complementary metal oxide semiconductors (CMOSs), for picture taking. Accordingly, lens that are adopted in these devices should be of good optical capability to ensure imaging quality.

A conventional lens system applied in the digital imaging devices is disclosed in U.S. Pat. No. 6,124,984, which teaches a variable magnification zoom lens system, comprising, from the object side, a first lens group having a negative refractive power, a second lens group having a positive refractive power, and a third lens group having a positive refractive power. The first and second lens groups are movable to change the distance therebetween, with associated distance change between the second and third lens groups, to realize zooming. The first and second lens groups are moved in such a way that the distance between the first and second lens groups is decreased, while the distance between the second and third lens groups is increased thereby realizing the function of zooming.

Another conventional lens system is shown in U.S. Pat. No. 5,434,710, which comprises three lens groups having negative, positive, and positive refractive powers, respectively. When the zoom lens is performed from the maximum wide-angle state to the maximum telephoto state thereof, the second and third lens groups are moved such that the distances between the first and second and third lens groups are all decreased.

A further conventional example is shown in US Patent Application Pre-Grant Publication No. 2003012567A1, which has a zoom lens system that also includes three lens groups having negative, positive, and positive refractive powers respectively. The device realizes zooming function by moving the first and second lens groups and thus changing the distances therebetween.

However, as digital imaging devices have been made smaller in size and compacter in arrangement in recently years, the structures of lens systems used in the devices are thus becoming increasingly compact. Hence, in order to ensure the lens systems to still be able to form accurate images on corresponding sensors, as well as to maintain its zoom ratio and higher optical capability, the assembling of the zoom lens systems has to be improved so as to meet higher requirements thereof.

SUMMARY OF THE INVENTION

An object of the present invention is, therefore, to provide a lens system having a compact structure and excellent optical capability.

In order to achieve the above object and overcome the above-identified deficiencies in the prior arts, a lens system in accordance with the present invention comprises, in sequence from an object side to an image side thereof, a first lens group having negative refractive power, a second lens group having positive refractive power, and a third lens group having positive refractive power. The first lens group comprises a plurality of lenses, among which one lens is made of resin having Abbe number greater than 55. The second lens group comprises a composite lens having object side and image side surfaces on which aspheric resin layers are formed, respectively. Moreover, the ratio between the radius of curvature of the aspheric resin layer on the object side surface and that of the aspheric resin layer on the image side surface is between 0.8 and 1.1. The third lens group has a positive lens made of resin having Abbe number greater than 55. When the lens system is being zoomed, the first lens group remains stationary and if performing from the maximum wide-angle state to the maximum telephoto state thereof, the second lens group is moved away from an image plane of the lens system, while the third lens group is moved toward the image plane. Thus, the distance between the first and second lens groups is decreased while the distance between the second and third lens groups is increased.

A diaphragm member is set near an object side of the second lens group, and is movable with the second lens group. The first lens group has a negative lens in the object side thereof and a positive lens in the image side thereof. The negative lens is made of resin.

The composite lens of the second lens group is composed of a positive lens and a negative lens adhesively bonded together. A glass plate is set between the third lens group and the image plane. The ratio of the total length from the object side surface of the first lens group to the image side of the lens system and the diagonal length of a sensor of a digital imaging device adopting the lens system is less than 2.9.

Compared with the prior arts, the lens system in accordance with the present invention comprises negative and positive lens groups. Hence, during the course of zooming, the first lens groups remains stationary, and If performing from the maximum wide-angle state to the maximum telephoto state thereof, the second lens group is moved away from the image plane of the lens system, and the third lens group is moved toward the image plane. Thus, the distance between the first and second lens groups is decreased while the distance between the second and third lens groups is increased. Furthermore, as the lens system also satisfy multiple design conditions, it gains advantages such as compact structure and good optical capability thereof, and more particularly it can be applied in the imaging systems of digital imaging devices as mobile phones which can be used to take pictures, thin-type cameras, and so on.

Other objects, advantages, and novel features of the invention will become apparent from the following detailed description of preferred embodiments when taken in conjunction with the accompanying drawings.

BRIEF DESCRIPTION OF THE DRAWINGS

The present invention may best be understood through the following description with reference to the accompanying drawings, in which:

FIGS. 3a, 3b, 3c-1 to 3c-4 and 3d are plots of spherical aberration and off-axis chromatic aberration, astigmatism and distortion, coma aberration, and MTF-image height curves for the lens system in accordance with the first embodiment of the present invention at an intermediate position;

FIGS. 4a, 4b, 4c-1 to 4c-4 and 4d are plots of spherical aberration and off axis chromatic aberration, astigmatism and distortion, coma aberration, and MTF-image height curves for the lens system in accordance with the first embodiment of the present invention at a telephoto position;

FIGS. 5a, 5b, 5c-1 to 5c-4 and 5d are plots of spherical aberration and off-axis chromatic aberration, astigmatism and distortion, coma aberration, and MTF-image height curves for the lens system in accordance with a second embodiment of the present invention at a wide-angle position;

FIGS. 6a, 6b, 6c-1 to 6c-4 and 6d are plots of spherical aberration and off-axis chromatic aberration, astigmatism and distortion, coma aberration, and MTF-image height curves for the lens system in accordance with the second embodiment of the present invention at an intermediate position;

FIGS. 7a, 7b, 7c-1 to 7c-4 and 7d are plots of spherical aberration and off axis chromatic aberration, astigmatism and distortion, coma aberration, and MTF-image height curves for the lens system in accordance with the second embodiment of the present invention at a telephoto position;

FIGS. 8a, 8b, 8c-1 to 8c-4 and 8d are plots of spherical aberration and off-axis chromatic aberration, astigmatism and distortion, coma aberration, and MTF-image height curves for the lens system in accordance with a third embodiment of the present invention at a wide-angle position;

FIGS. 9a, 9b, 9c-1 to 9c-4 and 9d are plots of spherical aberration and off-axis chromatic aberration, astigmatism and distortion, coma aberration, and MTF-image height curves for the lens system in accordance with the third embodiment of the present invention at an intermediate position; and FIGS. 10a, 10b, 10c-1 to 10c-4 and 10d are plots of spherical aberration and off-axis chromatic aberration, astigmatism and distortion, coma aberration, and MTF-image height curves for the lens system in accordance with the third embodiment of the present invention at a telephoto position.

DETAILED DESCRIPTION OF THE PREFERRED EMBODIMENTS

Reference will now be made in detail to preferred embodiments of the present invention.

Figure 1A:
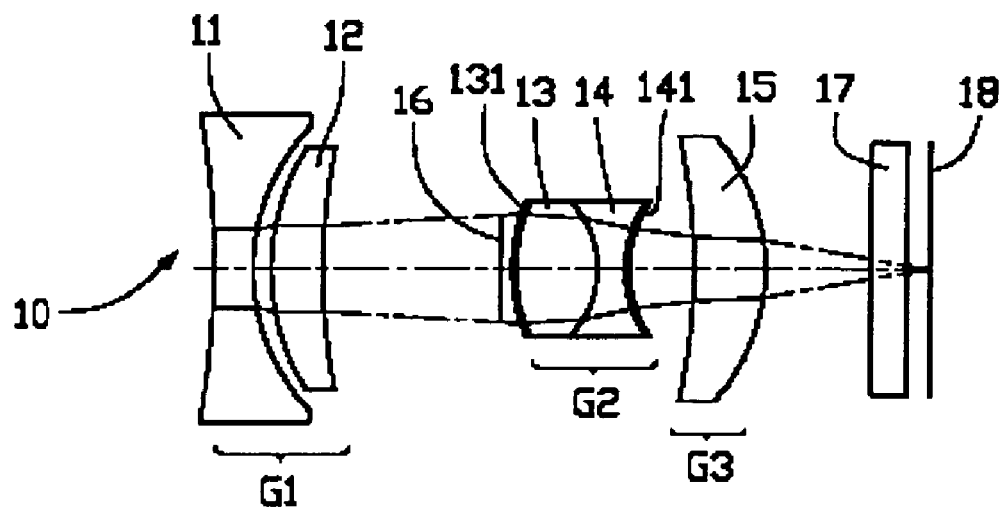
FIG. 1a is a schematic view showing spatial relationship among optical components of a lens system in accordance with the present invention at a wide-angle position.

With reference to the drawings and in particular to FIG. 1a, a lens system constructed in accordance with the present invention, generally designated with reference numeral 10, comprises three lens groups, which are, in sequence from an object side to an image side of the lens system, a first lens group G1 having negative refractive power, a second lens group G2 having positive refractive power, and a third lens group G3 having positive refractive power.

The first lens group G1 comprises a negative lens 11 and a positive lens 12. The negative lens 11 is made of resin material.

The second lens group G2 comprises a composite lens formed by bonding a positive lens 13 to a negative lens 14. The second lens group G2 is used to reduce optical loss and to compensate possible tolerance. Moreover, an aspheric resin layer 131 and an aspheric resin layer 141 are respectively formed on an object side (light beam incident side) surface and an image side (light beam coming out side) surface of the composite lens G2. The aspheric resin layer 131 corrects spherical aberration, while the aspheric resin layer 141 corrects astigmatism and coma aberration.

The third lens group G3 is a positive lens 15 made of resin material, which helps to decrease the total weight of the lens system 10, as well as to reduce power consumption in auto-focusing and extending/contracting operations, and is thus best suitable for the applications in camera-included mobile phones.

A diaphragm member 16 is set on an optical axis of the lens system 10. The diaphragm member 16 is positioned next to the object side surface of the second lens group G2. In other words, the diaphragm member 16 is located on the left side of the positive lens 13 of the second lens group G2, as viewed in the drawings. The diaphragm member 16 is movable with the second lens group G2. Furthermore, a glass plate 17 is arranged in front of an image plane 18 of the lens system 10 for optical filtering and anti-reflection.

Figure 1B:
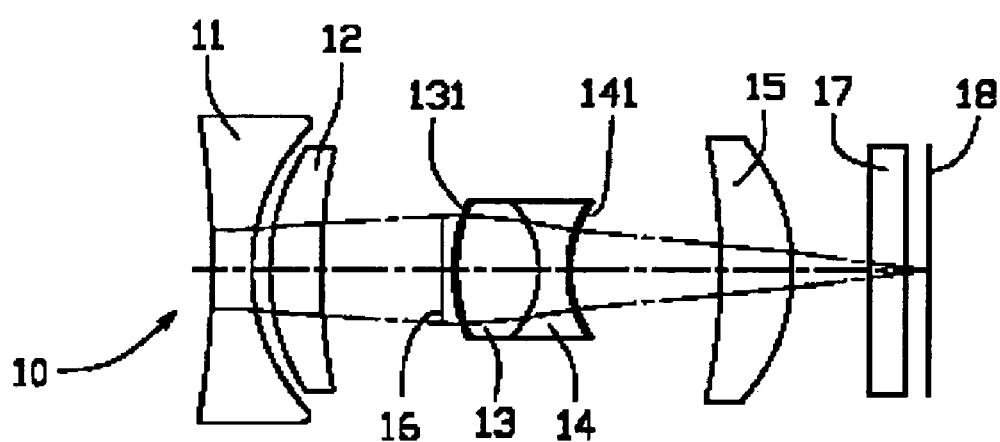
FIG. 1b is a schematic view showing spatial relationship among optical components of the lens system in accordance with the present invention when at an intermediate position.
Figure 1C:
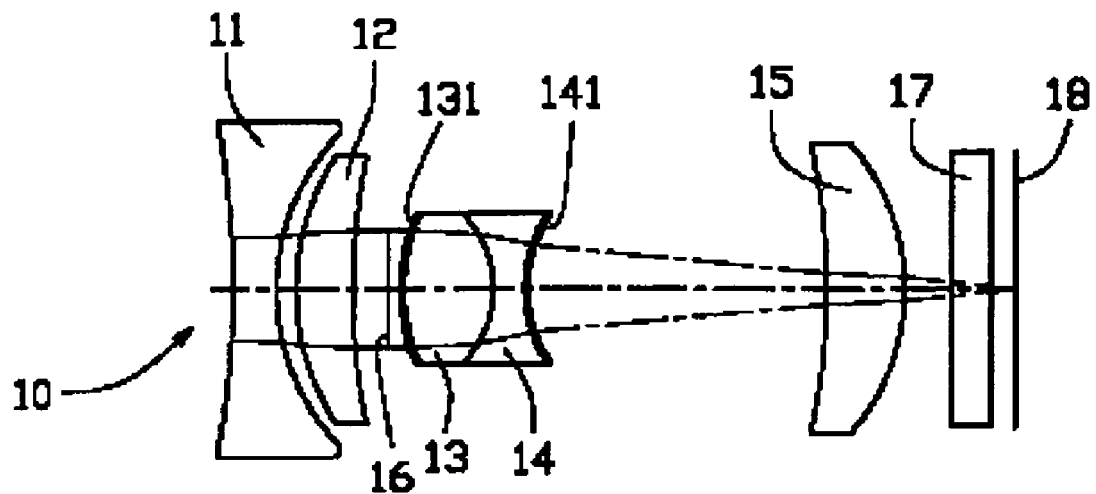
FIG. 1c is a schematic view showing spatial relationship among optical components of the components of the lens system in accordance with the present invention when at a telephoto position.

Also referring to FIGS. 1a-1c, in zooming process, the first lens group G1 remains stationary, and when performing from the maximum wide-angle state to the maximum telephoto state, the second lens group G2 and the diaphragm member 16 are moved in a direction away from the image plane 18 while the third lens group G3 is moved toward the image plane 18. Thus, the distance between the first and second lens groups G1 and G2 is decreased while the distance between the second and third lens groups G2 and G3 is increased.

Furthermore, the lens system 10 of the present invention satisfies the following conditions:

(1) $1.1 > r9/r10 > 0.8$;
(2) v1 and v11>55, and made of resin materials;
(3) the first lens group G1 remains stationary in zooming;
(4) the second lens group G2 is comprised of a composite lens and has an aspheric layer on each of the two opposite surfaces respectively; and
(5) $TT/SD < 2.9$, where r9 is radius of curvature of a ninth surface of the lens system 10, which in the embodiment illustrated, is the object side surface of the aspheric resin layer 141; r10 is the radius of curvature of a tenth surface of the lens system, which is the image side surface of the aspheric resin layer 141; v1 is Abba number of the material of a first surface of the lens system, which in the embodiment illustrated is the negative lens 11 of the first lens group G1; and v11 is Abba number of the material of an eleventh surface of the lens system, which is the positive lens 15 of the third lens group G3; TT is the total length of the lens system 10 measured from the first surface, which is the object side surface of the negative lens 11 of the first lens group G1, to the image plane 18; and SD is a diagonal length of a sensor, which can be CCD or CMOS.

In the above condition (1), if the ratio of r9/r10 exceeds a lower limit, then the wide-angle side appears to be extroverted coma aberration, and the aberration in the T direction of the wide-angle side cannot be sufficiently corrected. If the ratio of r9/r10 exceeds an upper limit, then the aberration in the T direction of the wide-angle side will be superfluous, and as the outside edge of the resin becomes thicker, the machining process becomes more complicated.

In the above-mentioned condition (2), if v1 and v11 both exceed a lower limit, it is difficult to correct off-axis chromatic aberrations and multiple chromatic aberrations. Using resin materials to make the lens helps to reduce the lens weight and power consumption in performing auto-focusing and extending/contracting operations. This makes the device of the present invention very suitable for applications, such as mobile phones.

The lens system 10 of the present invention also need to satisfies the above condition (4), which allows the lens group G2, which is made of glass that has stable optic behavior, to take the most part of refractivity power of the whole system. Moreover, bonding the two parts of the composite lens of the second lens group G2 with adhesives can compensate at least partly tolerance thereof. The aspheric resin layer 131 formed on the surface of the second lens group G2 that is close to the diaphragm member 16 is generally for correcting spherical aberration thereof, while the other aspheric resin layer 141 formed on the surface of the second lens group G2 that is close to the third lens group G3 is generally for correcting astigmatism and coma aberration thereof.

In the above-mentioned condition (5), if TT/SD exceeds an upper limit, then the size of the whole lens system 10 gets too large, which is against the trend of miniaturization.

Satisfying the above five conditions, the lens system 10 of the present invention has features including variable zooming ratio, excellent optical capability, and compact structure. It is especially applicable to the imaging systems of digital imaging device, such as thin-type camera and camera-included mobile phones.

In addition, the two aspheric resin layers 131 and 141 of the second lens group G2, the positive lens of the third lens group G3, and the negative lens 11 of the first lens group G1 of the lens system 10 in accordance with the present invention all adopt aspheric shapes, of which the formula is expressed as follows:

$$z = \frac{ch^2}{1+[1-(k+1)c^2h^2]^{1/2}} + Ah^4 + Bh^6 + Ch^8 + Dh^{10} + Eh^{12}$$

where z represents a sag amount which is defined as a distance from a point on the aspheric surface to a plane tangential to the aspheric surface at the optical axis, k is taper constant, c=1/r, r being radius of curvature, h is the height of the lens, A is the 4th order aspheric coefficient, B is the 6th order aspheric coefficient, C is the 8th order aspheric coefficient, D is the 10th order aspheric coefficient, E is the 12th order aspheric coefficient.

A first embodiment of the lens system 10 in accordance with the present invention presents the following data:

| No. of surface | Radius (mm) | Thickness (mm) | Refractivity (Nd) | Abbe No. (Vd) |
|---|---|---|---|---|
| | Focal value F = 4.584 (W) to 5.909 (M) to 8.76 (T) | | | |
| | Effective caliber FNO = 2.8 (W) to 3.315 (M) to 4.275 (T) | | | |
| 1 | −32.15 | 0.95 | 1.52603 | 56.4 |
| 2 | 3.46 | 0.4 | | |
| 3 | 4.878 | 1.2 | 1.58547 | 29.9 |
| 4 | 13.073 | 3.986 (W) to 2.644 (M) to 0.7 (T) | | |
| 5 | diaphragm | 0.23 | | |
| 6 | 3.15 | 0.07 | 1.5202 | 52.0 |
| 7 | 3.45 | 1.9 | 1.77248 | 49.6 |
| 8 | −2.07 | 0.5 | 1.5927 | 35.3 |
| 9 | 2.695 | 0.09 | 1.5202 | 52.0 |
| 10 | 2.803 | 1.45 (W) to 3.378 (M) to 6.149 (T) | | |
| 11 | −22.7 | 1.6 | 1.52603 | 56.4 |
| 12 | −3.97 | 2.394 (W) to 1.808 (M) to 0.981 (T) | | |
| 13 | infinity | 0.81 | 1.51633 | 64.1 |
| 14 | infinity | 0.4 | | |

W: wide-angle position, M: intermediate position, and T: telephoto position

Date of the aspheric coefficients of the surfaces of the lens system 10 of the first embodiment are as follows:

Surface No. 1 (the object side surface of the negative lens 11 of the first lens group G1):
 k=0
 A=−0.0039928456,
 B=0.00063219424,
 C=−5.6047532e−005,
 D=3.3235853e−006, and
 E=−9.7084348e−008;

Surface No. 2 (the image side surface of the negative lens 11 of the first lens group G1:
 k=−2.473162,
 A=−0.00028261674,
 B=0.00066712928,
 C=−0.0001182458,
 D=1.9500137e−005, and
 E=−1.278296e−006;

Surface No. 6 (the object side surface of the aspheric resin layer 131 of the second lens group G2):
 k=−0.9086523,
 A=−0.003327378,
 B=−0.00040571117,
 C=−0.00077856289,
 D=0.00013029151, and
 E=−1.9428396e−005;

Surface No. 10 (the image side surface of the aspheric resin layer 141 of the second lens group G2):
 k=−1.788942,
 A=0.024238061,
 B=0.0032090703,
 C=−0.0024265882,
 D=0.0011932072, and
 E=−0.00028832461;

Surface No. 11 (the object side surface of the positive lens 15 of the third lens group G3):
 k=0,
 A=−0.0017950792,
 B=−0.00046020759,
 C=0.00021989113,
 D=−4.0382498e−005, and
 E=2.2301507e−006; and Surface No. 12 (the image side surface of the positive lens 15 of the third lens group G3):
 k=0.4019908,
 A=0.0049266766,
 B=−0.0016073299,
 C=0.00046772124,
 D=−5.7868441e−005, and
 E=2.6128195e−006.

Figure 2A:
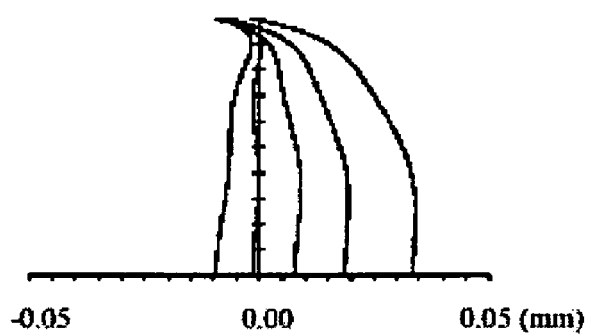
FIGS. 2a, 2b, 2c-1 to 2c-4 and 2d are plots of spherical aberration and off-axis chromatic aberration, astigmatism and distortion, coma aberration, and MTF-image height curves for the lens system in accordance with a first embodiment of the present invention at a wide-angle position.
Figure 2B:
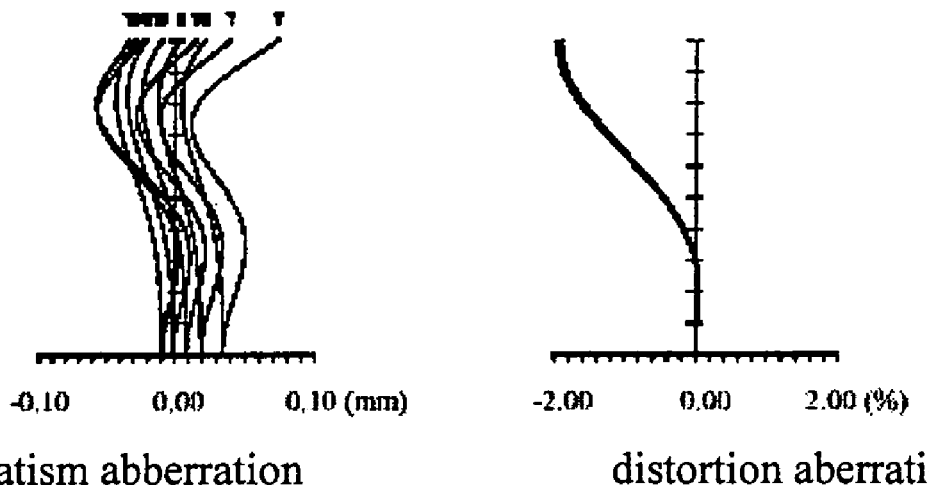
Figure 2D:
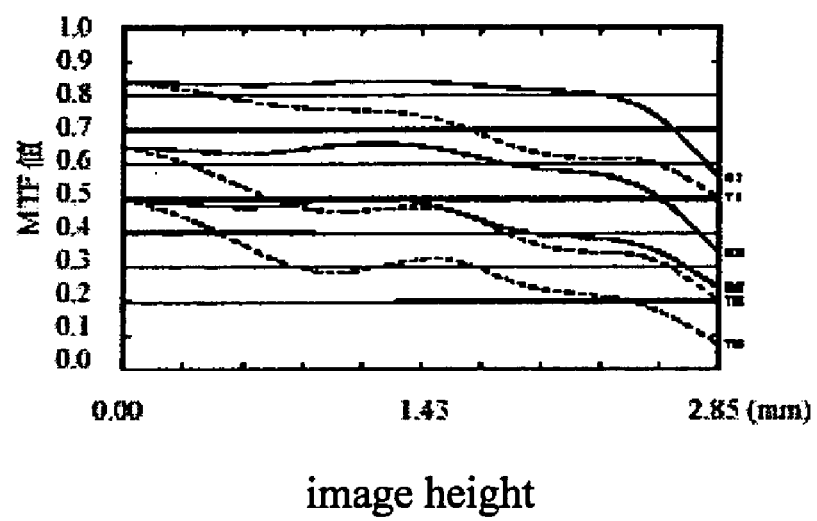
Figures 1, 2C:
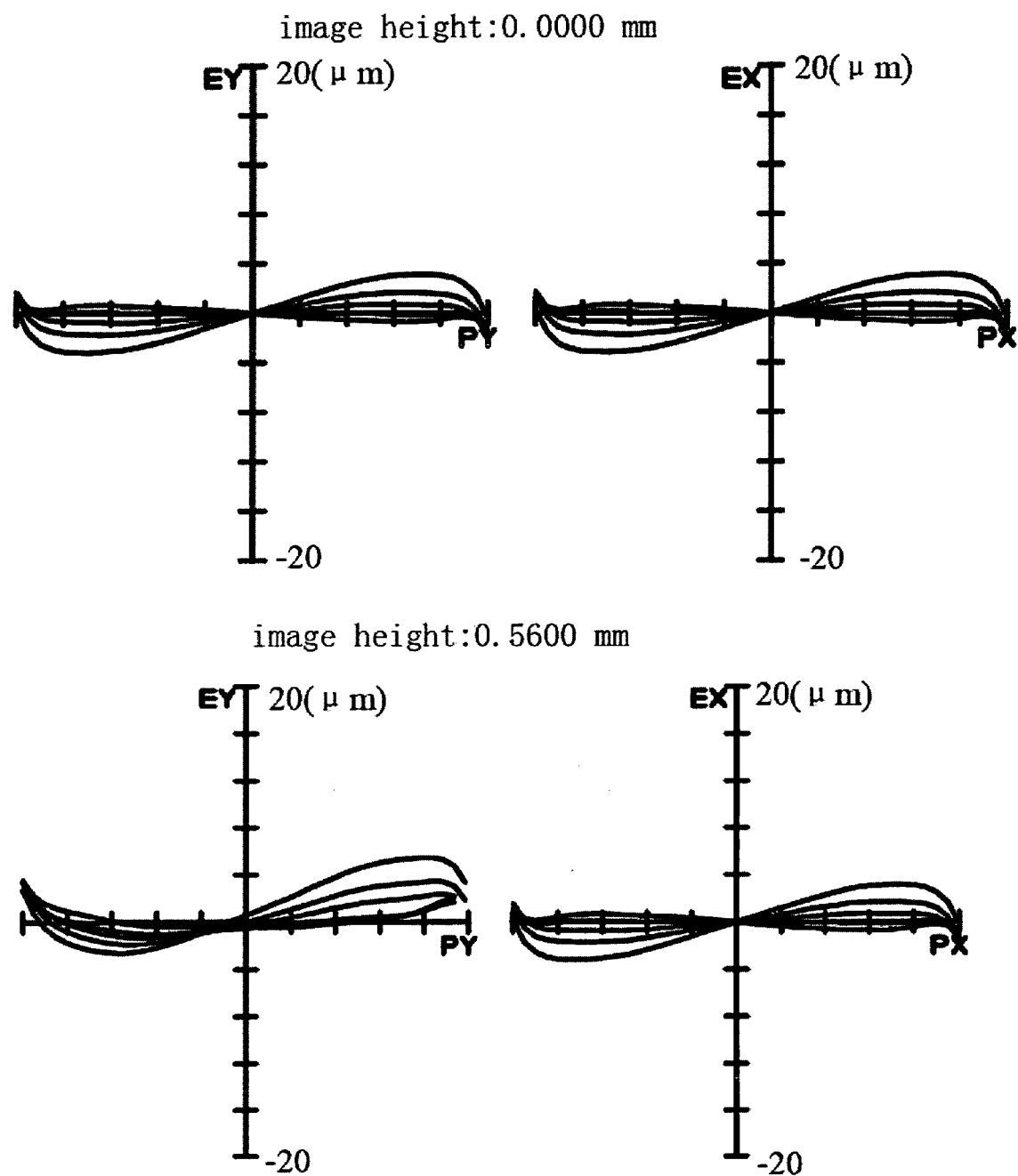
Figures 2, 2C:
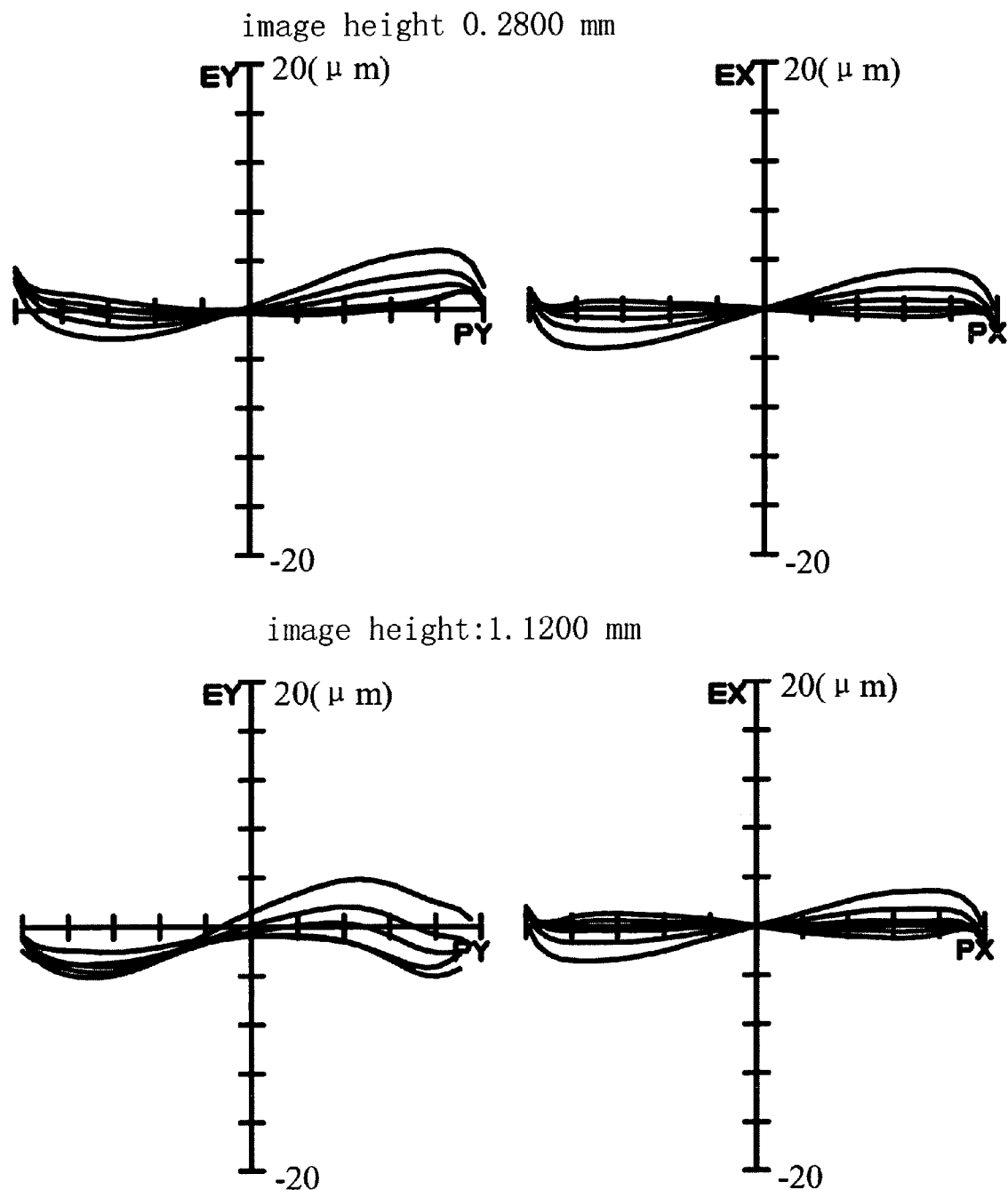
Figure 3A:
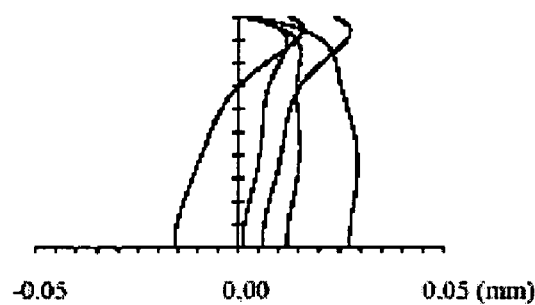
Figure 3B:
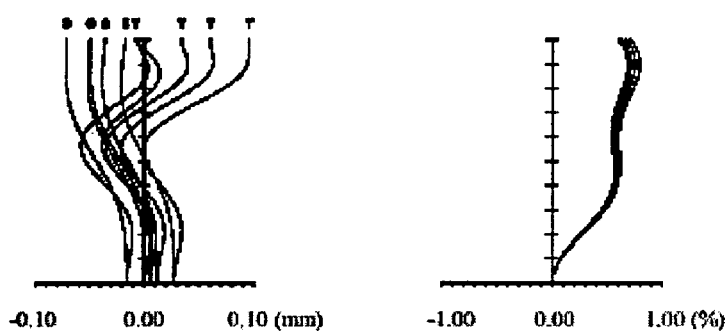
Figure 3D:
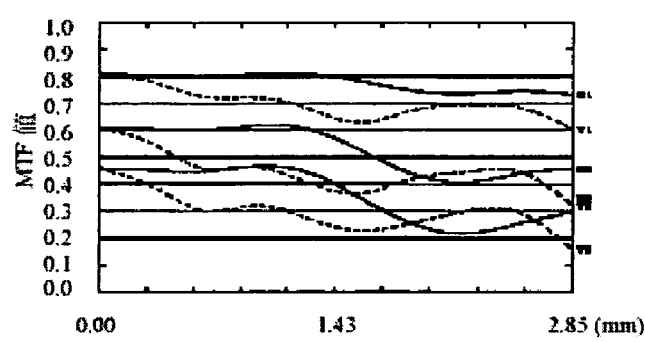
Figure 3C:
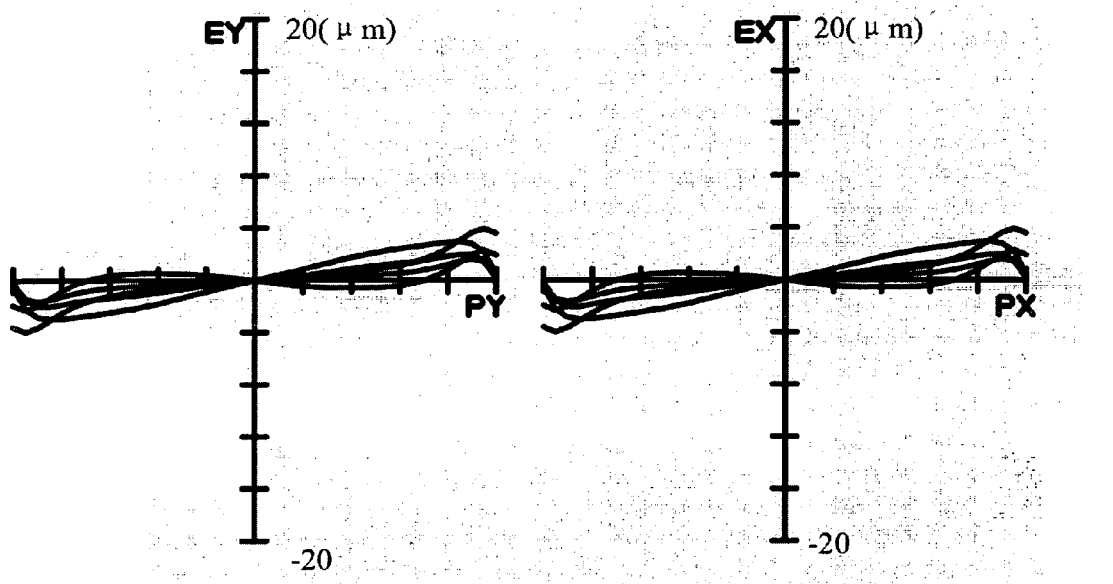
Figure 1:
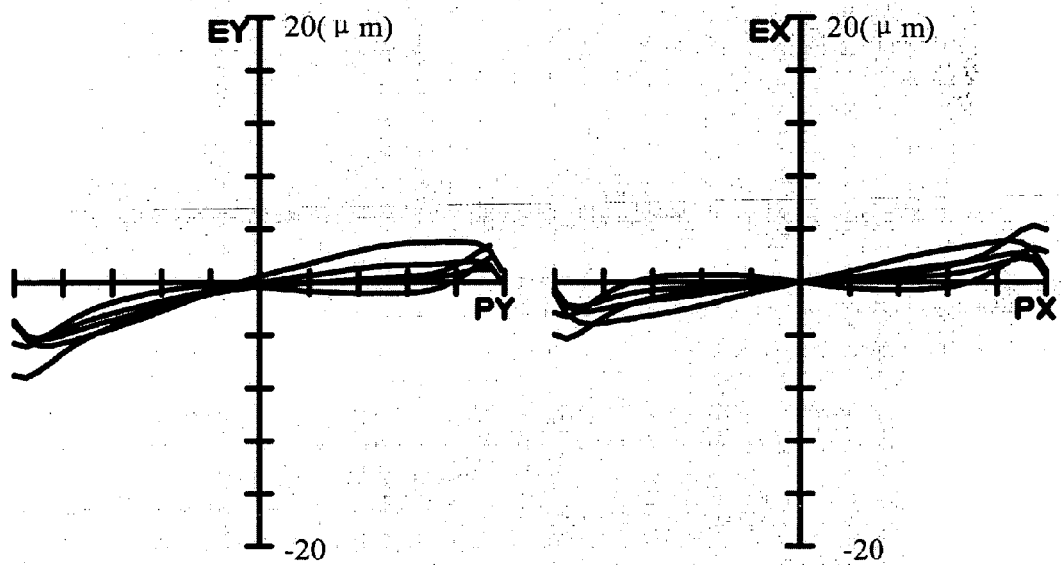
Figure 3C:
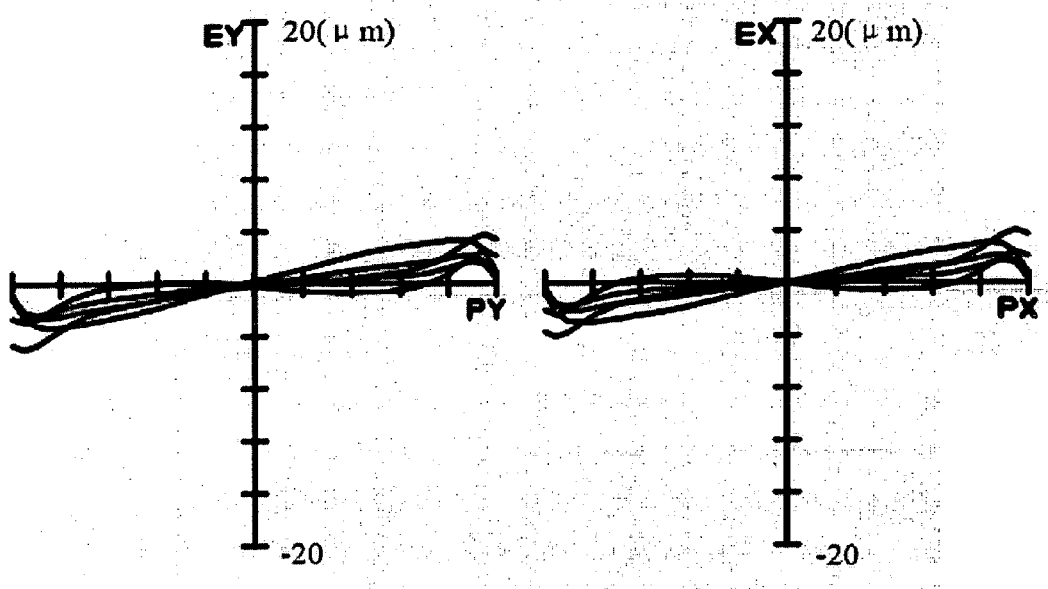
Figure 2:
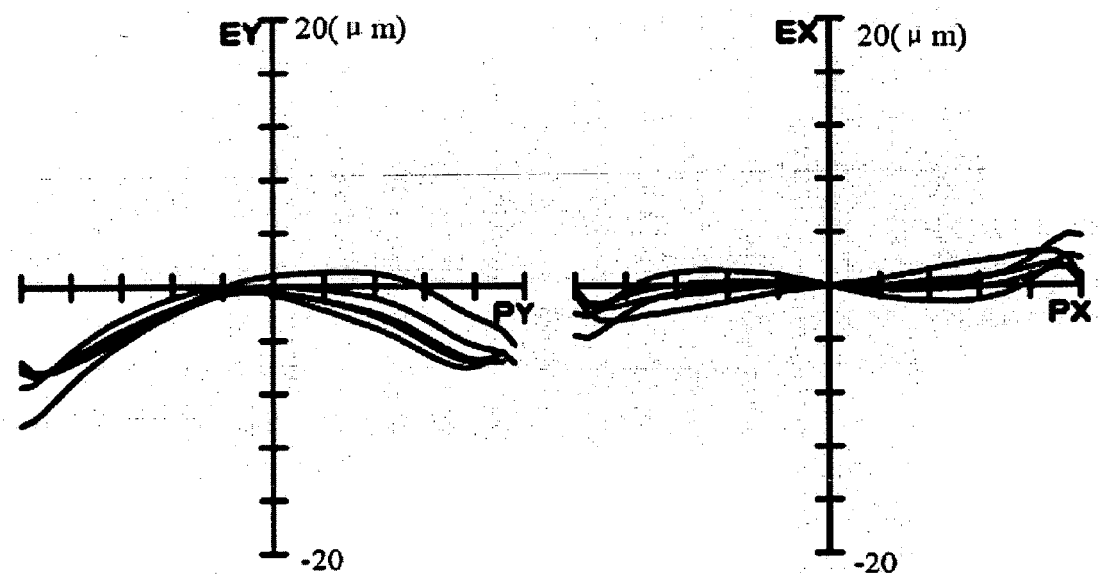
Figure 3C:
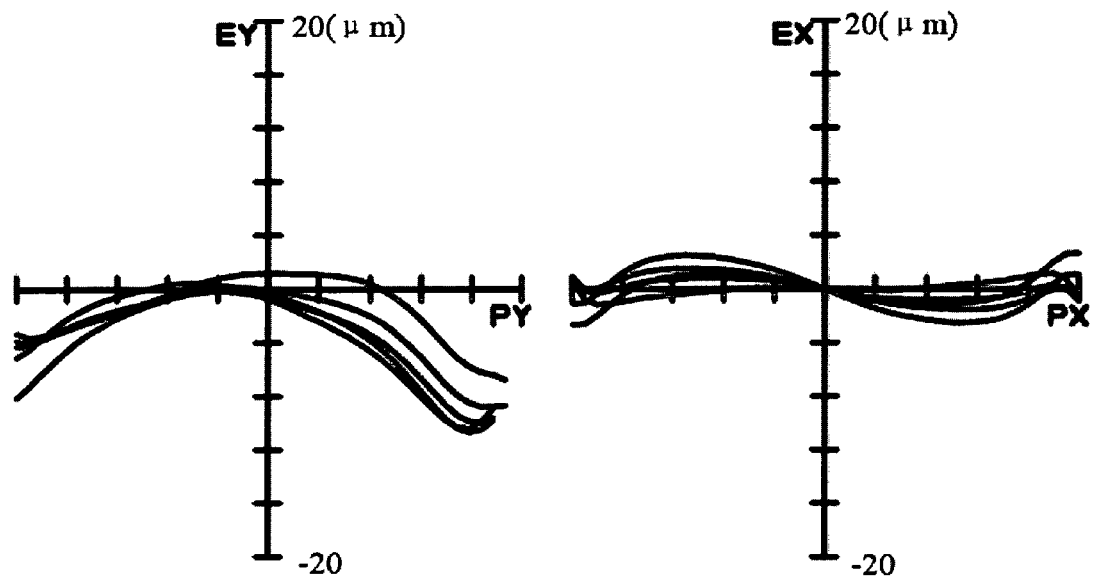
Figure 3:
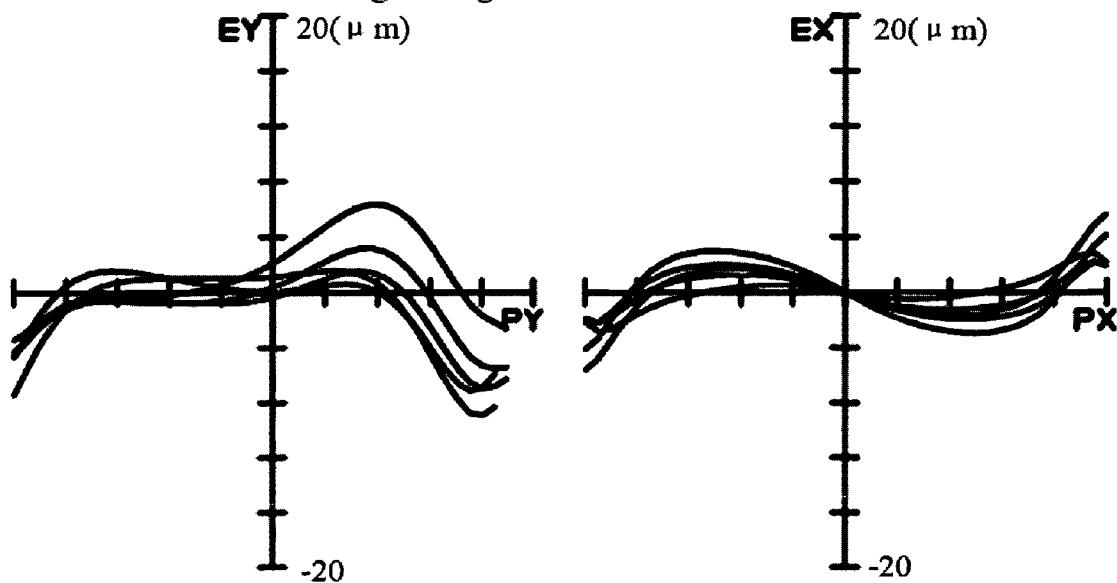
Figure 4A:
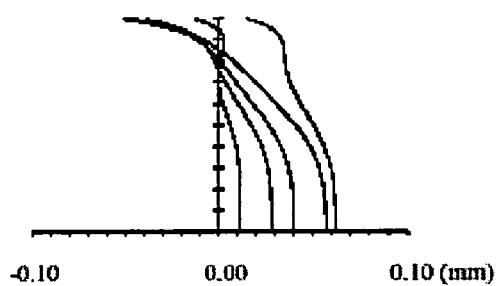
Figure 4B:
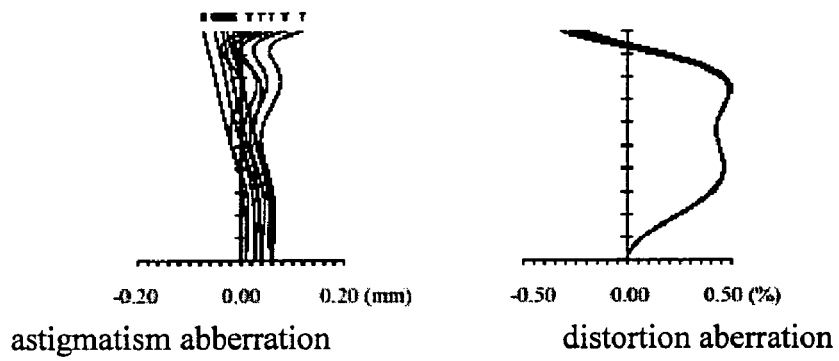
Figure 4D:
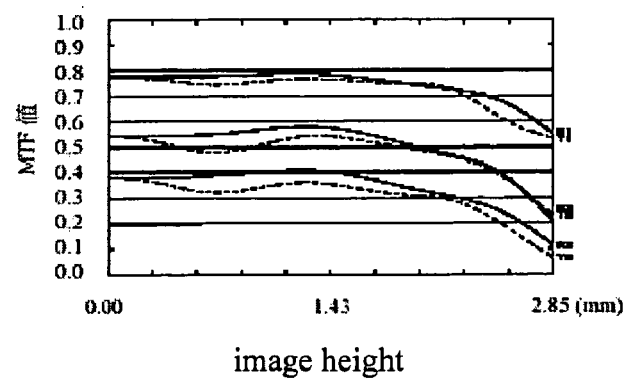
Figure 4C:
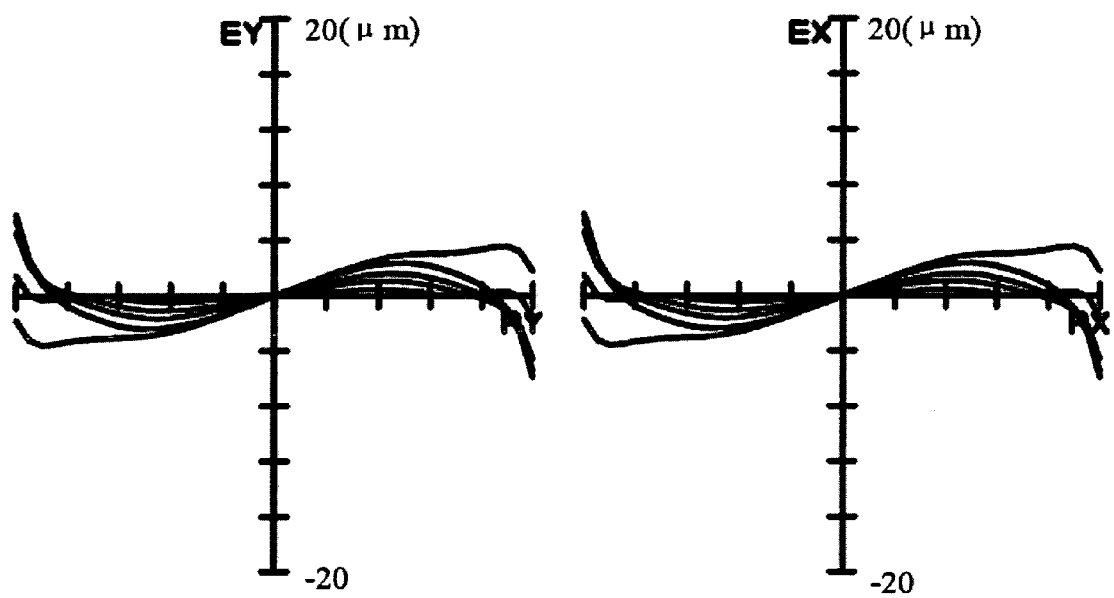
Figure 1:
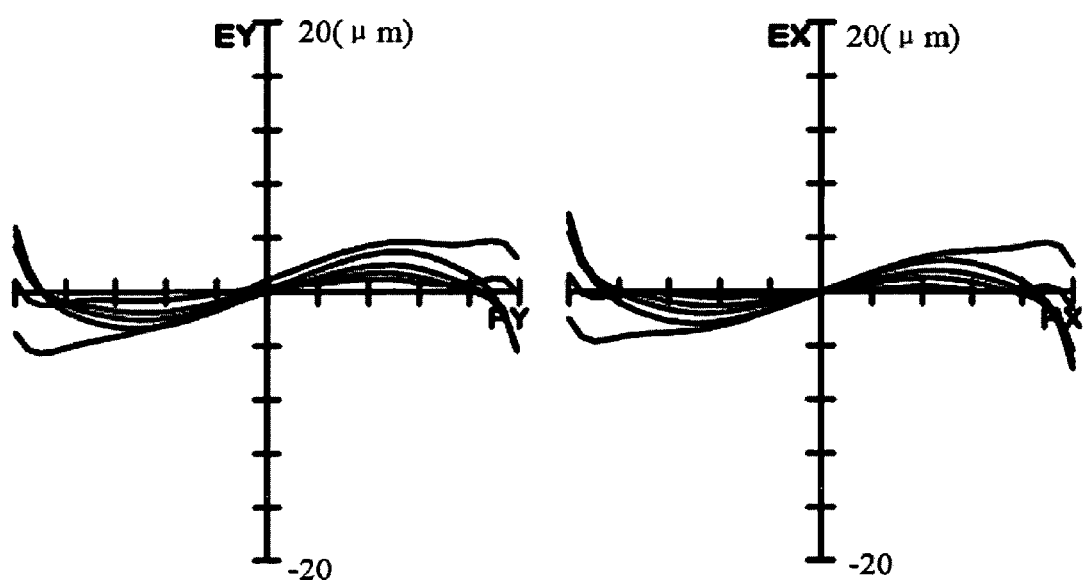
Figure 4C:
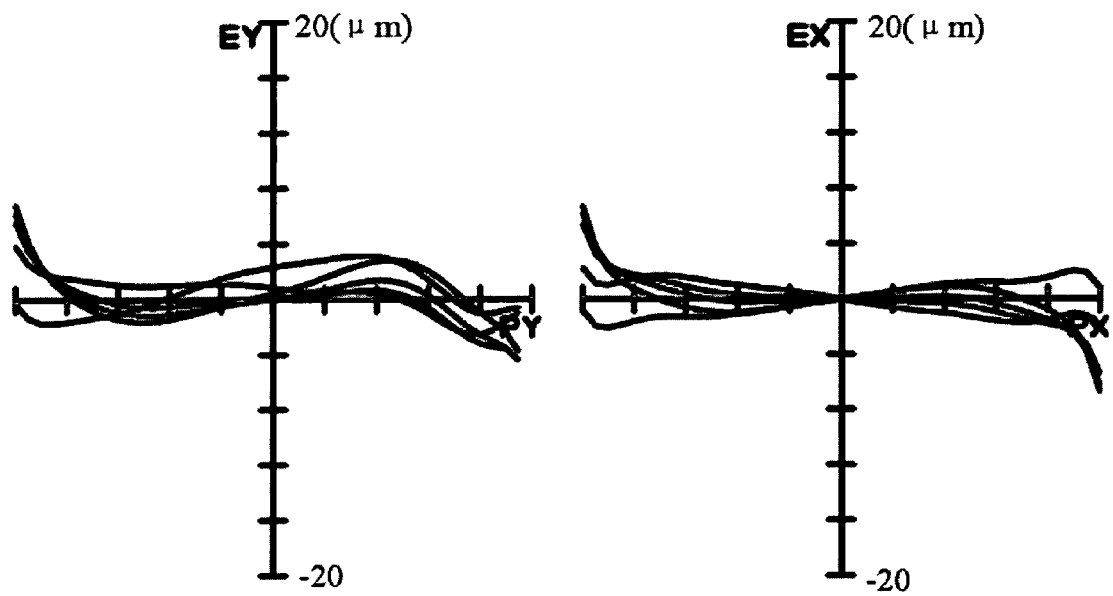
Figure 3:
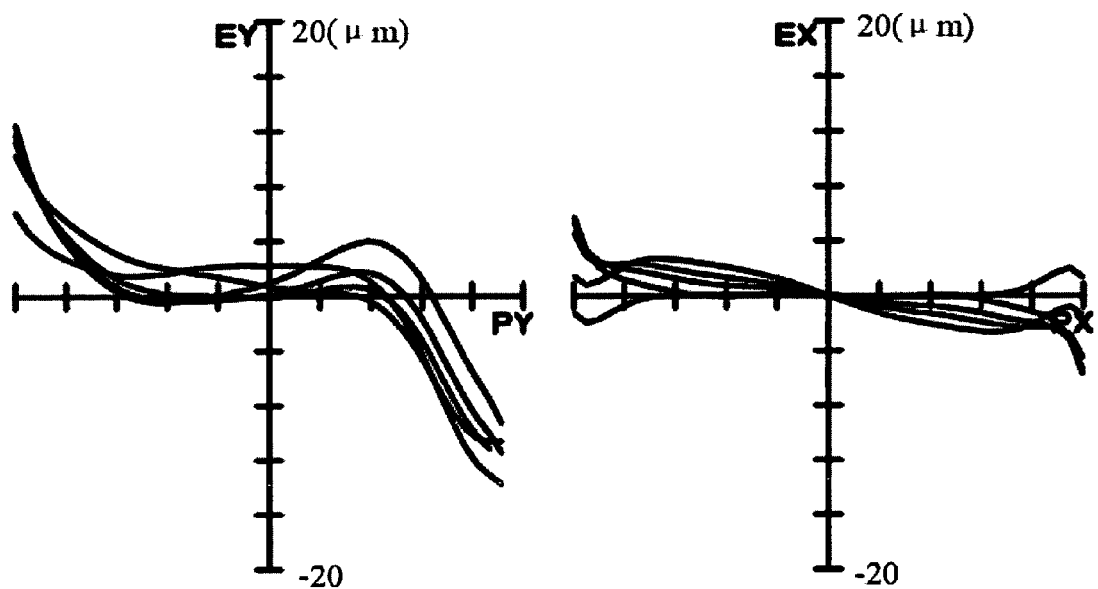
Figure 4C:
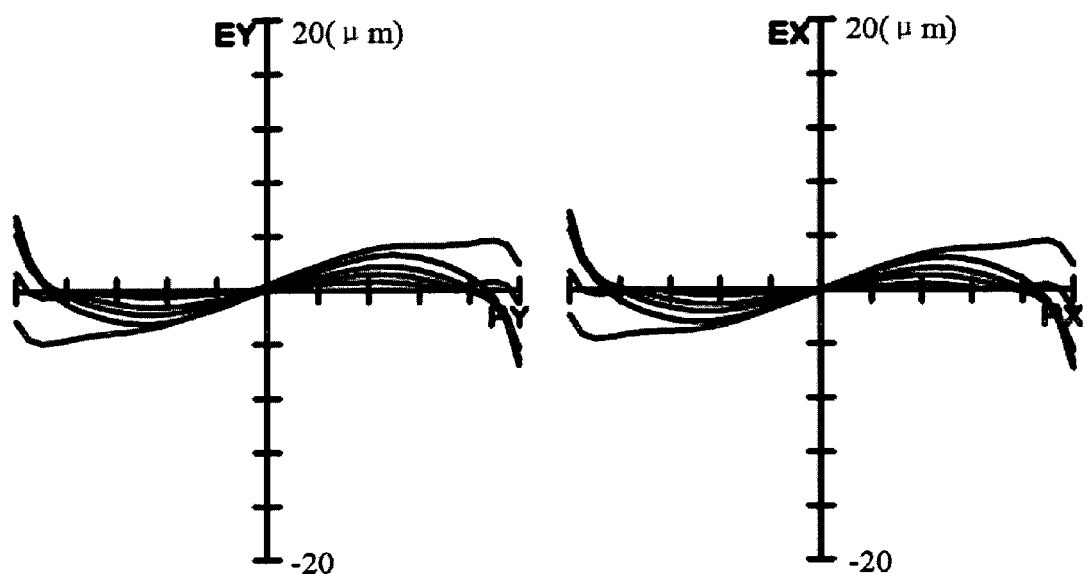
Figure 2:
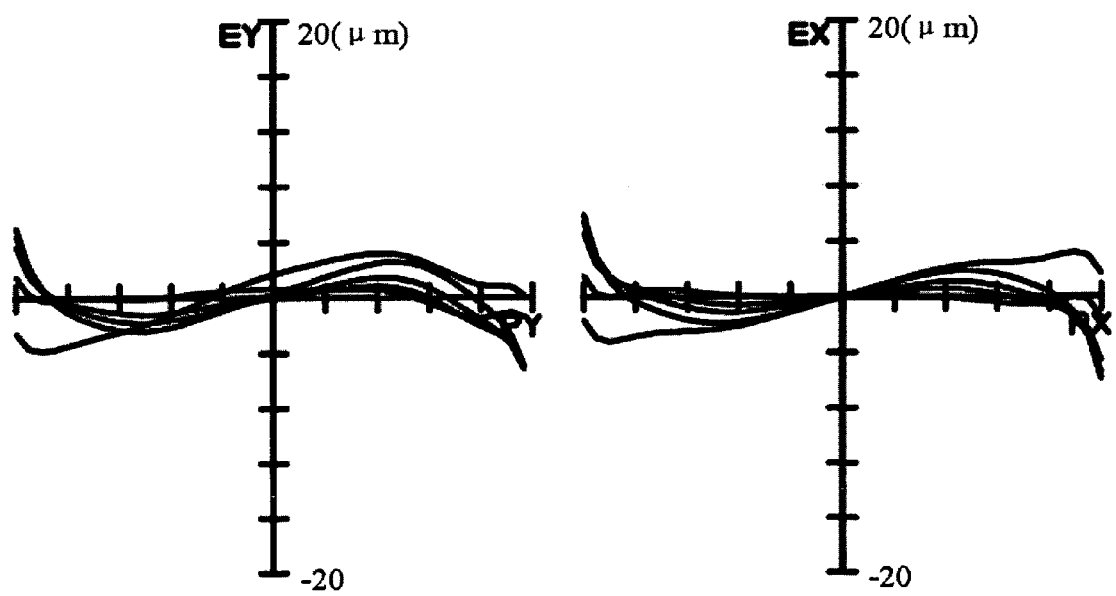
Figure 4C:
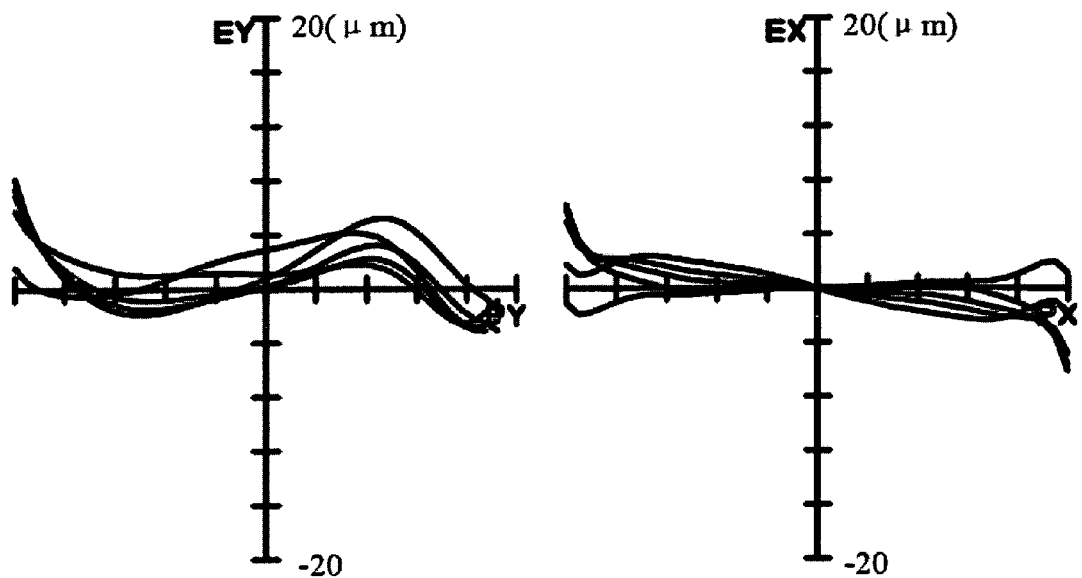
Figure 4:
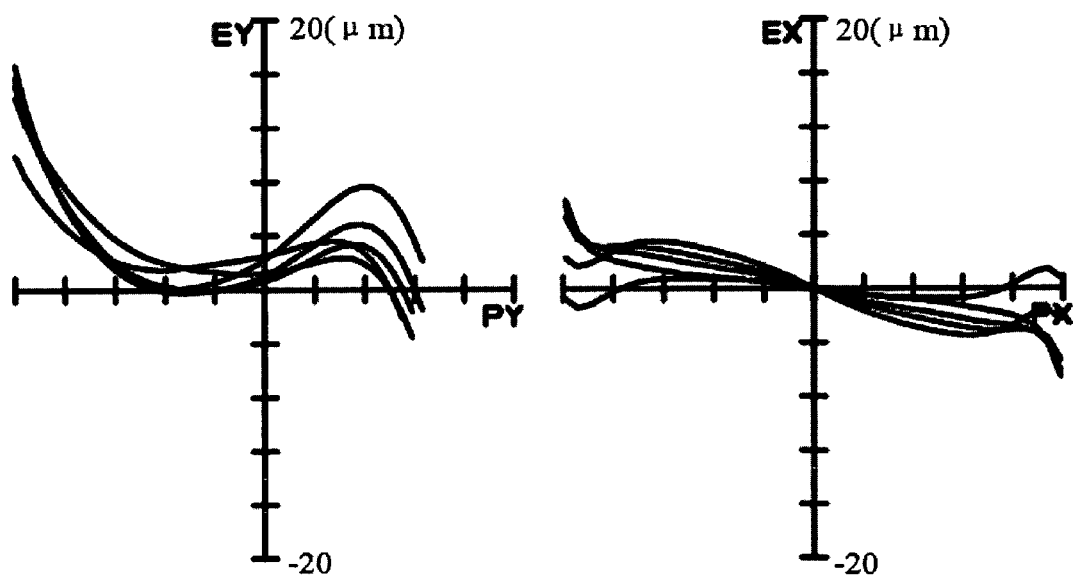

The first embodiment shows the design parameters for all lens surfaces from the object side of the first lens group G1 to the image side of the glass plate 17, wherein r9/r10=2.695/2.803=0.96, which is between 0.8 and 1.1. Abbe number (v1) of the material of the negative lens 11 of the first lens group G1 equals to 56.4 and Abbe number (v11) of the material of the positive lens 15 of the third lens group G3 equals to 56.4, both being greater than 55. Moreover, TT/SD=15.98/5.7=2.8<2.9. According to the above first embodiment, all possible aberrations of the lens system 10 of the present invention can be effectively corrected as shown in FIGS. 2a, 2b, 2c-1 to 2c-4, 2d, 3a, 3b, 3c-1 to 3c-4, 3d, 4a, 4b, 4c-1 to 4c-1 and 4d, wherein abscissa axis of FIGS. 2d, 3d, and 4d indicates image height, and ordinate axis indicates percentage of MTF. And the S1 and T1, S2 and T2 as well as S3 and T3 curvature lines as shown respectively refer to the radial values (S) and the tangential values (T) thereof got when the spatial frequency thereof is respectively 60.0OCY/MM 120.0OCY/MM and 180.0OCY/MM.

A second embodiment of the lens system 10 in accordance with the present invention presents the following data:

Focal value F = 4.598 (W) to 5.765 (M) to 8.704 (T)
Effective caliber FNO = 2.8 (W) to 3.25 (M) to 4.22 (T)

| No. of surface | Radius (mm) | Thickness (mm) | Refractivity (Nd) | Abbe No. (Vd) |
|---|---|---|---|---|
| 1 | −28.426 | 0.9 | 1.52603 | 56.4 |
| 2 | 3.448 | 0.4 | | |
| 3 | 5.228 | 1.2 | 1.58547 | 29.9 |
| 4 | 16.886 | 4.03 (W) to 2.811 (M) to 0.7 (T) | | |
| 5 | diaphragm | 0.2 | | |
| 6 | 3.157 | 0.07 | 1.5202 | 52.0 |
| 7 | 3.35 | 1.9 | 1.77248 | 49.6 |
| 8 | −2.205 | 0.5 | 1.5927 | 35.3 |
| 9 | 2.415 | 0.09 | 1.5202 | 52.0 |
| 10 | 2.867 | 1.6 (W) to 3.311 (M) to 6.188 (T) | | |
| 11 | −32.763 | 1.58 | 1.52603 | 56.4 |
| 12 | −4.164 | 2.33 (W) to 1.838 (M) to 1.072 (T) | | |
| 13 | infinity | 0.81 | 1.51633 | 64.1 |
| 14 | infinity | 0.4 | | |

W: wide-angle position, M: intermediate position, and T: telephoto position

Date of the aspheric coefficients of the surfaces of the lens system 10 of the second embodiment are as follows:

Surface No. 1 (the object side surface of the negative lens 11 of the first lens group G1):
k=−4.491598,
A=−0.0046567269,
B=0.00074092207,
C=−6.4602051e−005,
D=3.5735814e−006, and
E=−9.5855388e−008;

Surface No. 2 (the image side surface of the negative lens 11 of the first lens group G1:
k=−2.274072,
A=−0.001636635,
B=0.00074900688,
C=−9.4809881 e−005,
D=1.33261e−005, and
E=−8.5589741e−007;

Surface No. 6 (the object side surface of the aspheric resin layer 131 of the second lens group G2):
k=−0.7558133,
A=−0.0030257652,
B=−0.00050574732,
C=−0.00052558507,
D=0.00011274549, and
E=−2.2536818e−005;

Surface No. 10 (the image side surface of the aspheric resin layer 141 of the second lens group G2):
k=0.02422049,
A=0.014719578,
B=0.0010096362,
C=−0.0004181737,
D=0.00027961549, and
E=−0.00012107857;

Surface No. 11 (the object side surface of the positive lens 15 of the third lens group G3):
k=−1.609301,
A=−0.00089513868,
B=−0.00070606882,
C=0.00026448652,
D=−4.1410934e−005, and
E=2.1905892e−006; and Surface No. 12 (the image side surface of the positive lens 15 of the third lens group G3):
k=0.3139023,
A=0.0048895015,
B=−0.0015311343,
C=0.00040343957,
D=−4.7542638e−005, and
E=2.0639635e−006.

Figure 5A:
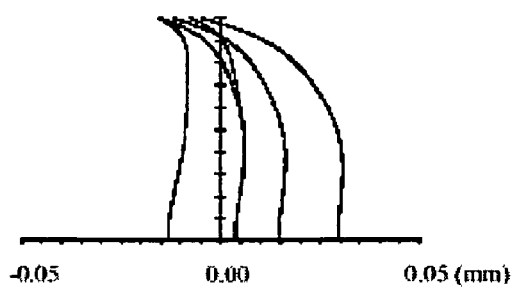
Figure 5B:
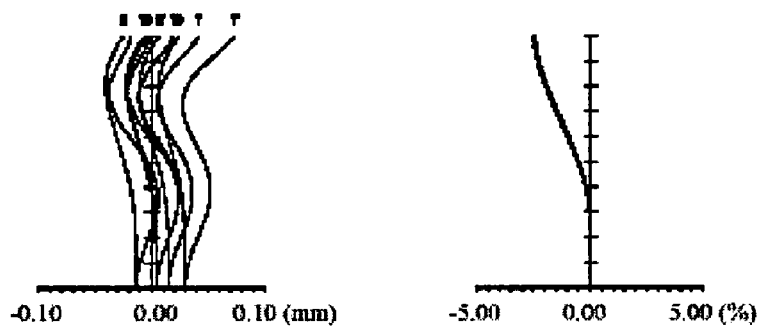
Figure 5D:
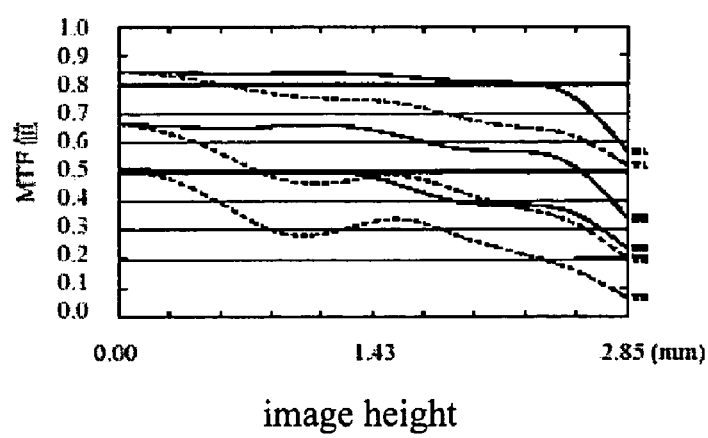
Figures 1, 5C:
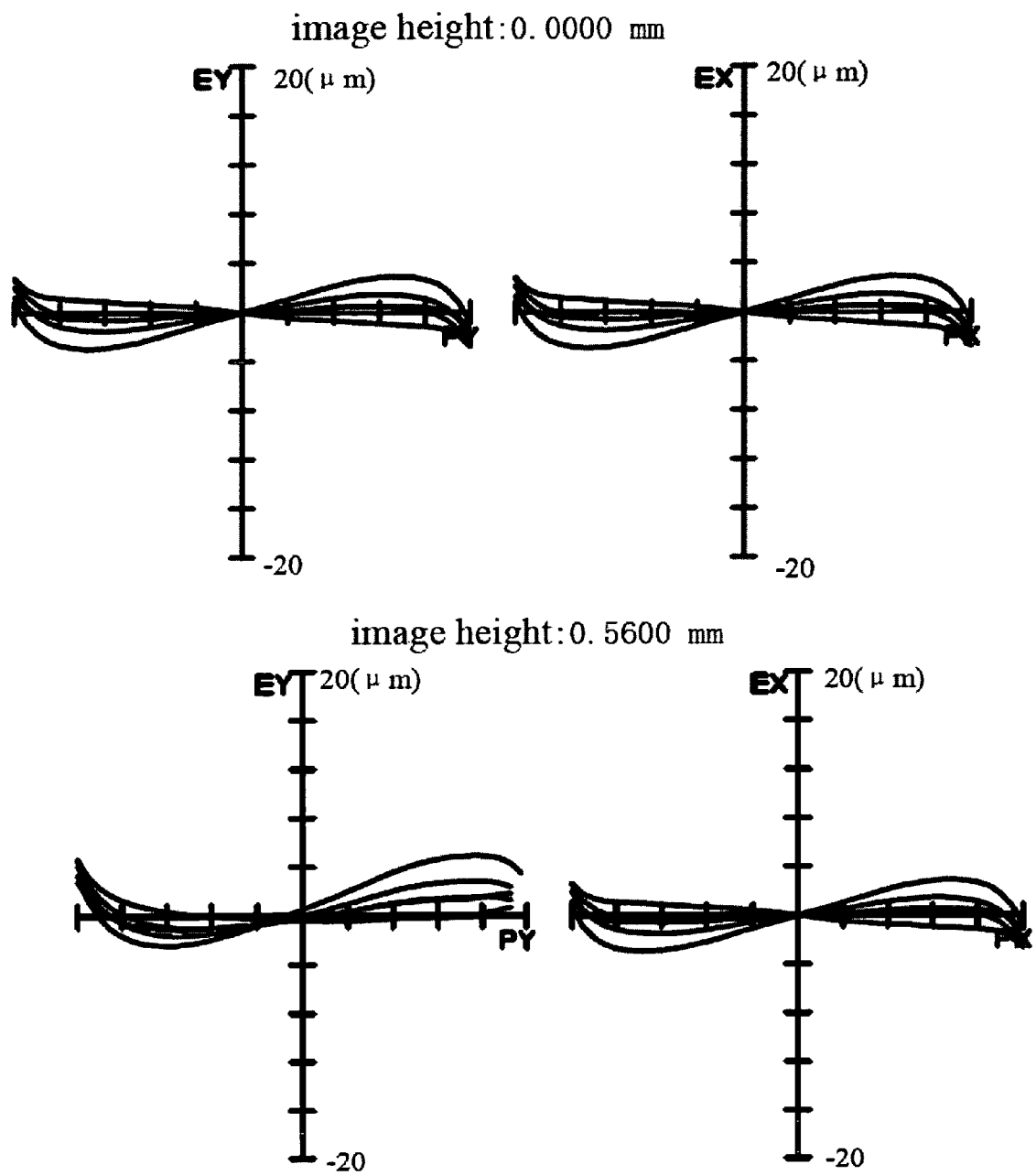
Figure 5C:
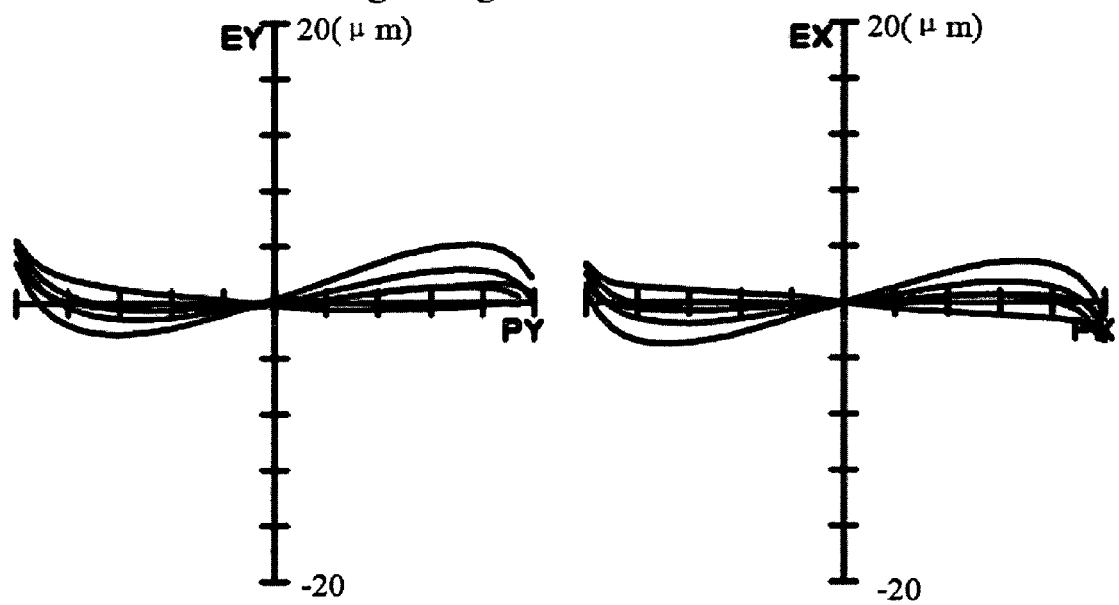
Figure 2:
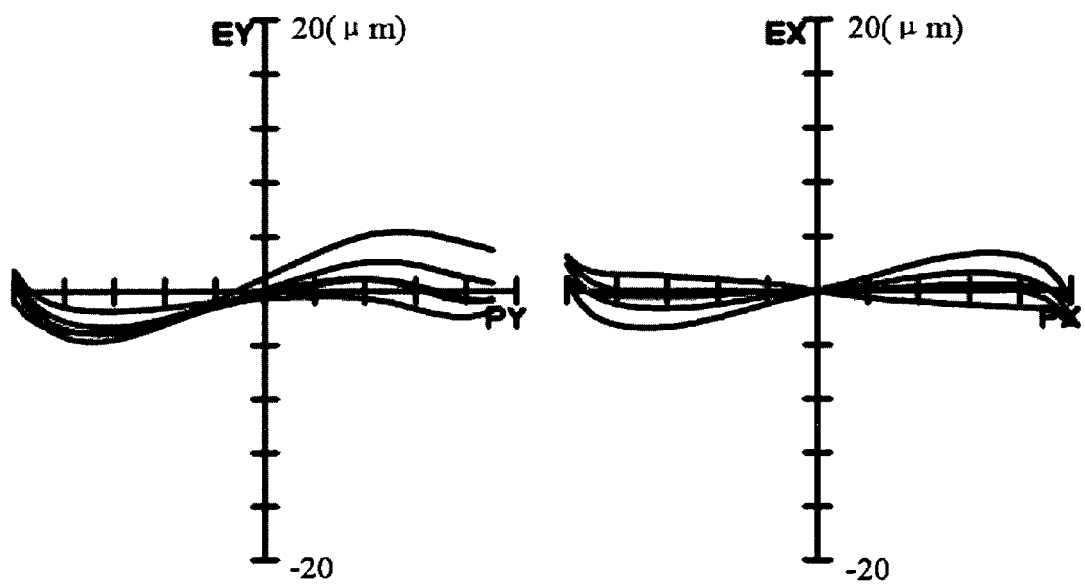
Figure 5C:
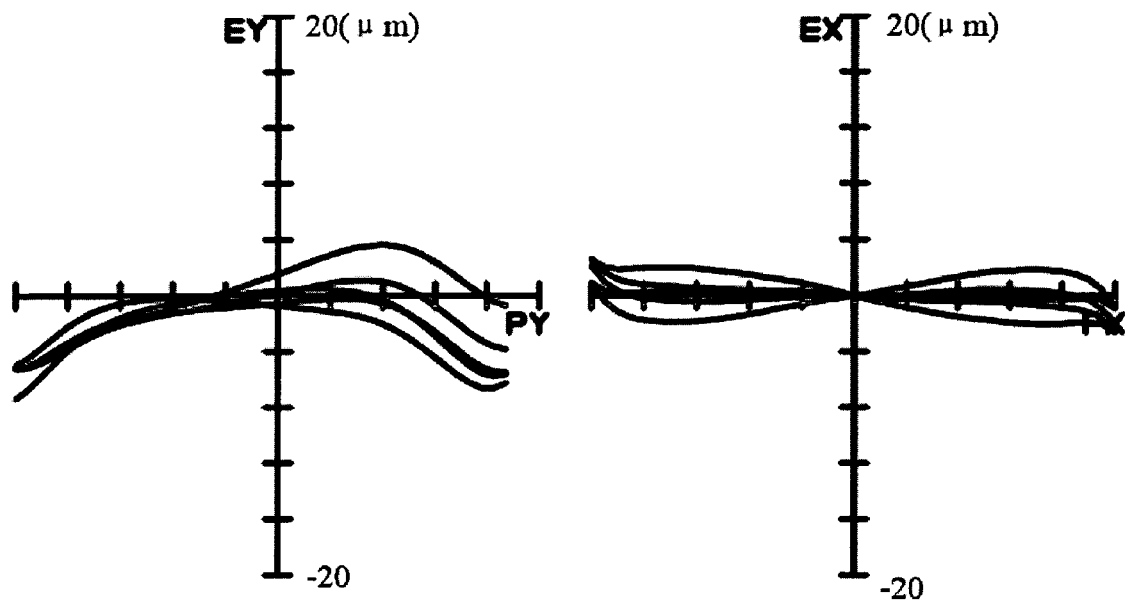
Figure 3:
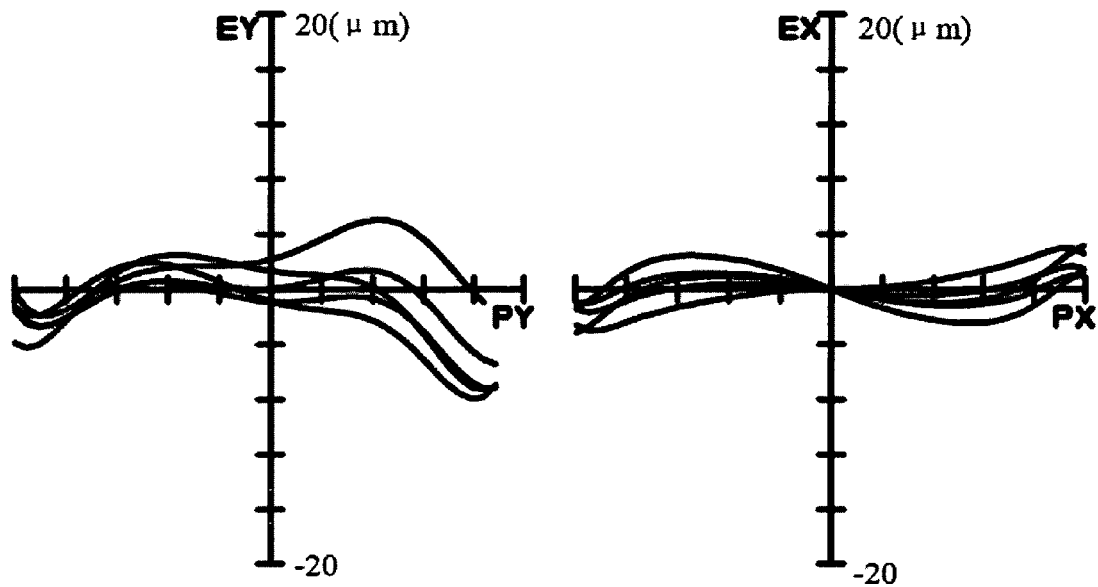
Figure 5C:
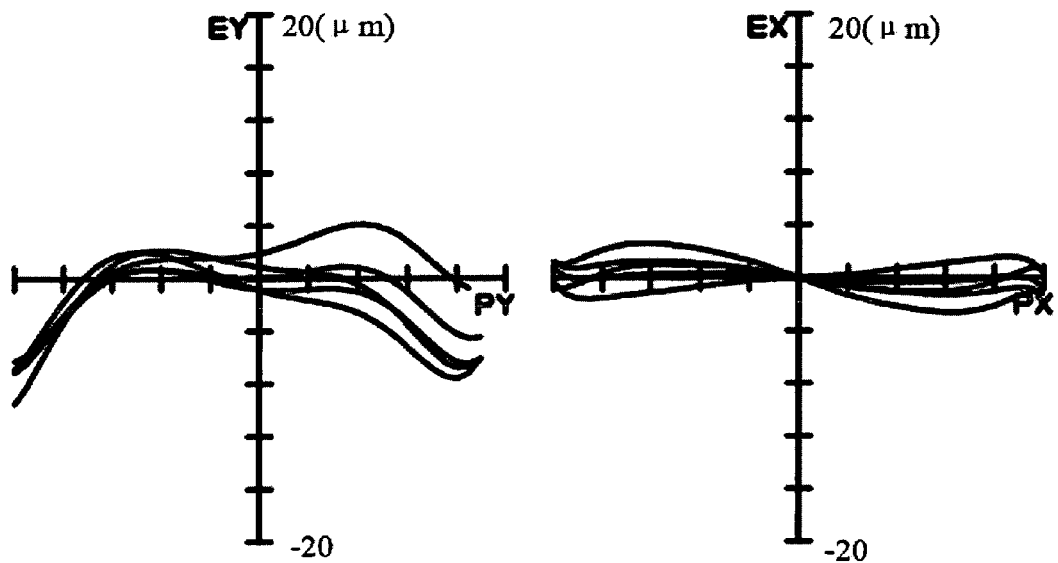
Figure 4:
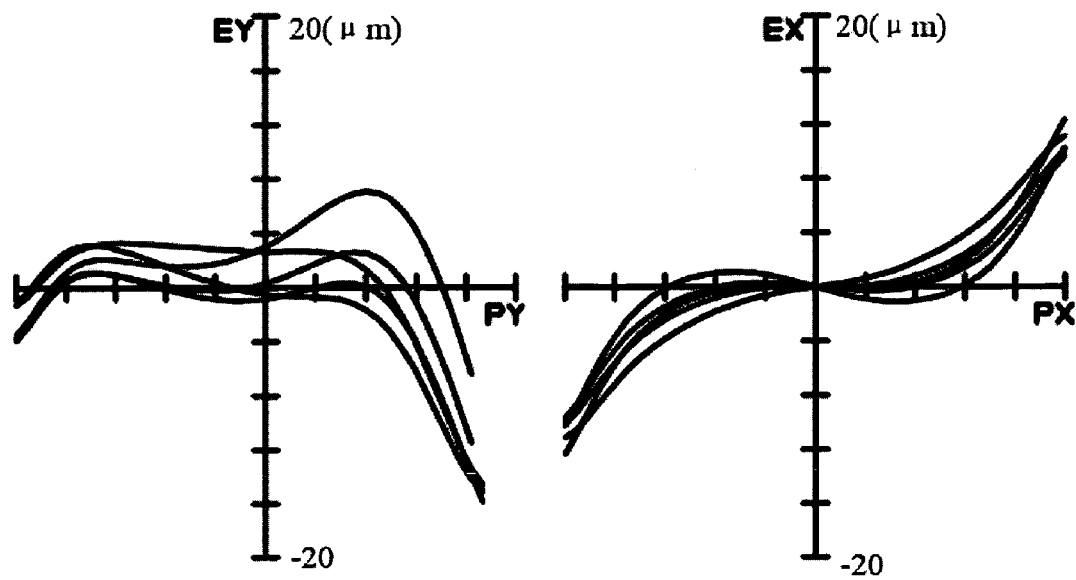
Figure 6A:
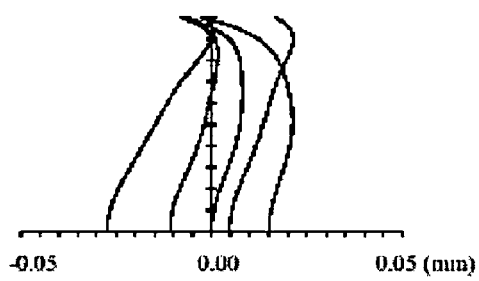
Figure 6B:
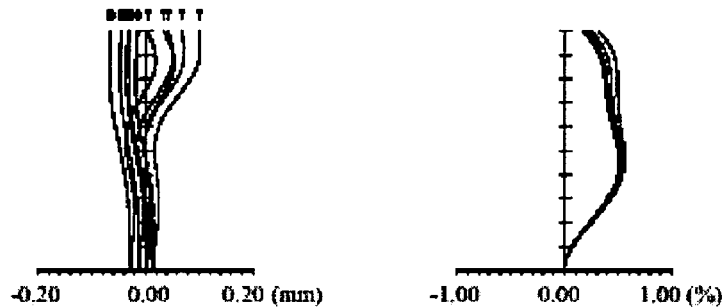
Figure 6D:
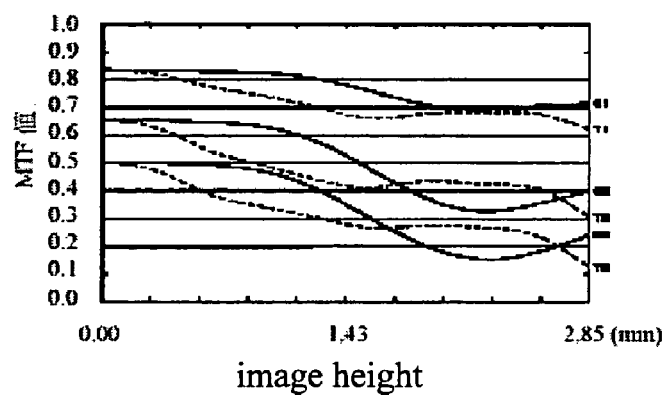
Figure 6C:
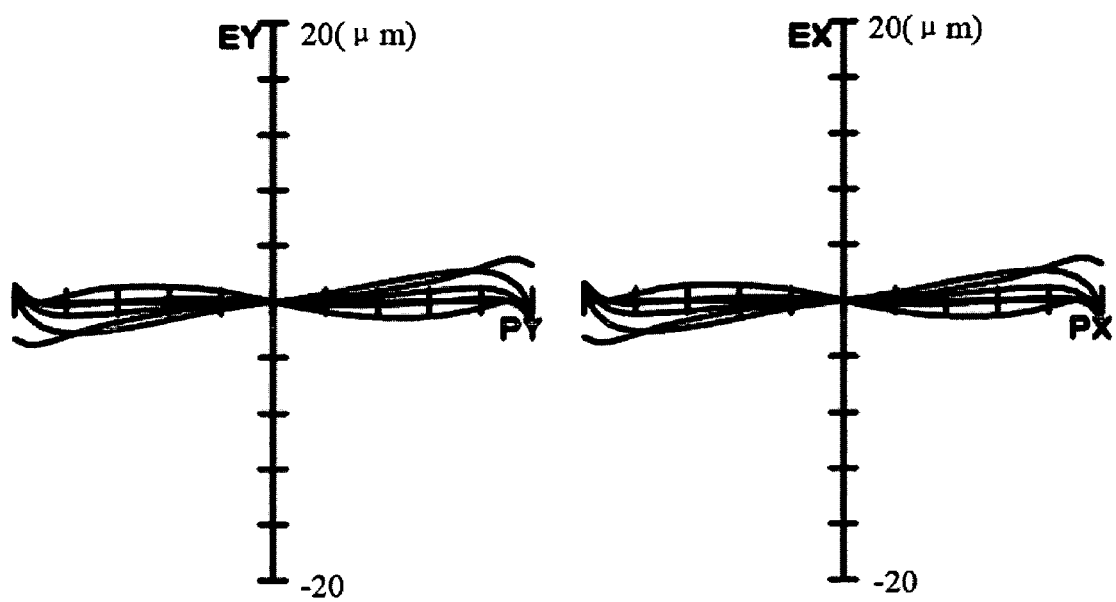
Figure 1:
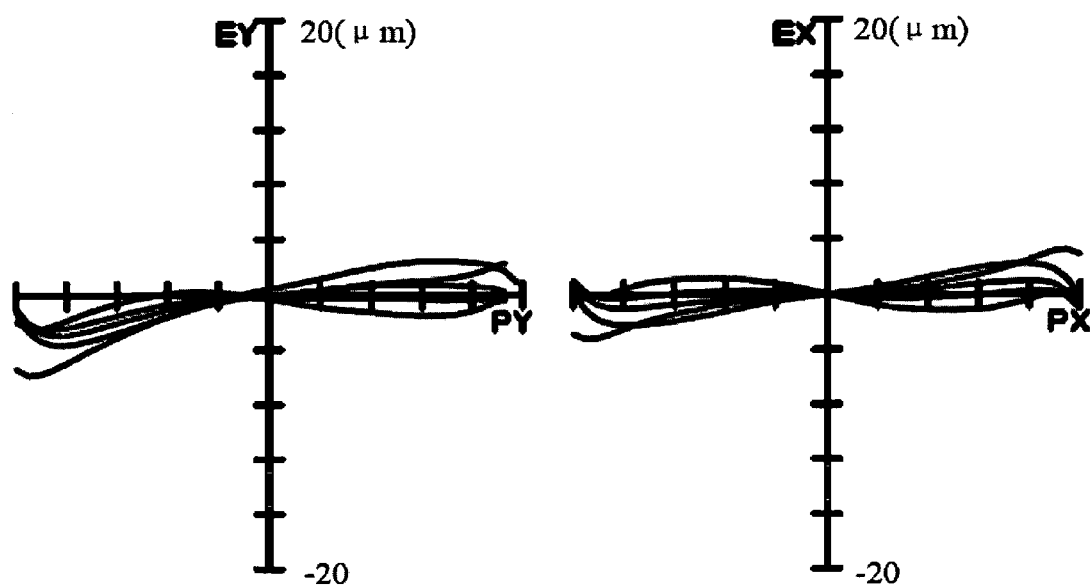
Figure 6C:
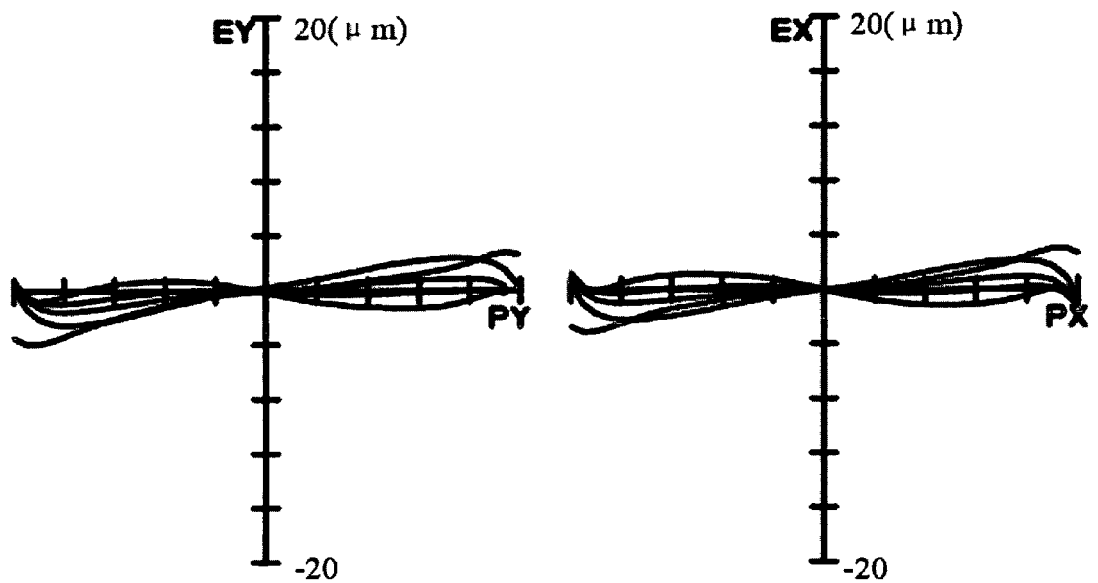
Figure 2:
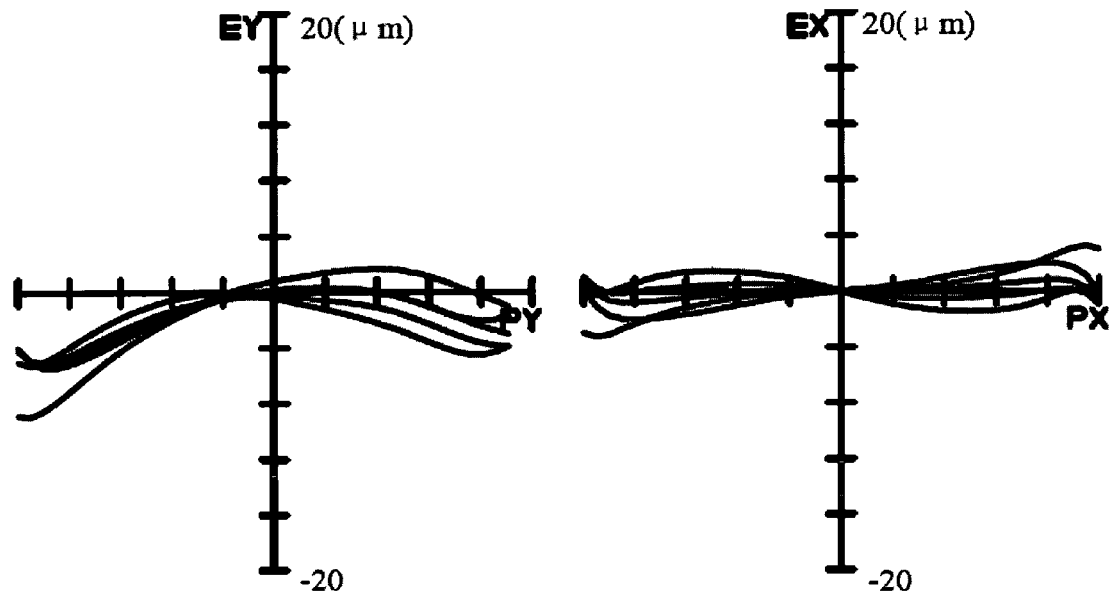
Figure 6C:
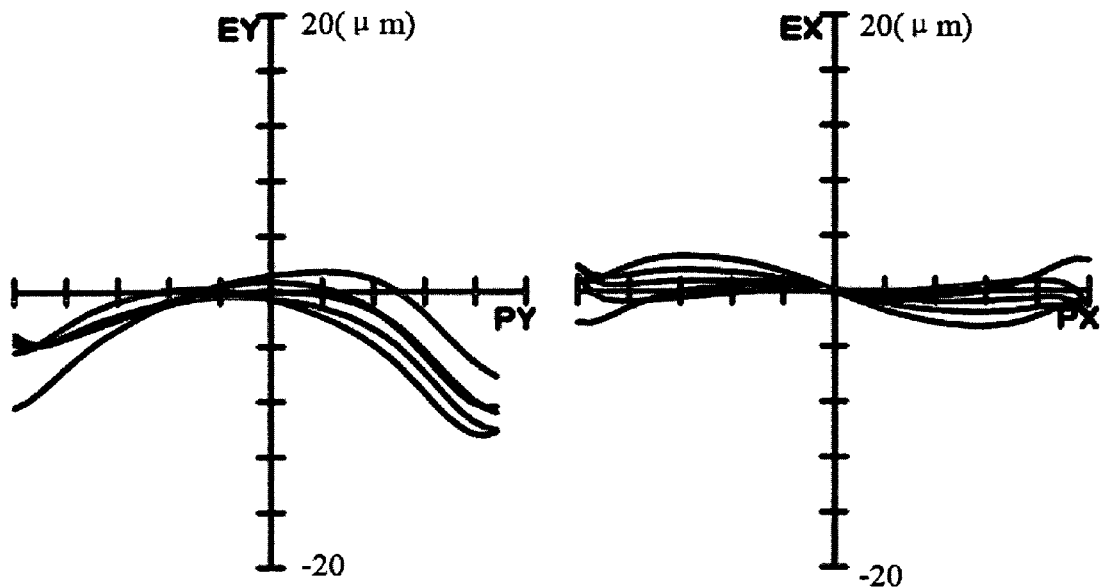
Figure 3:
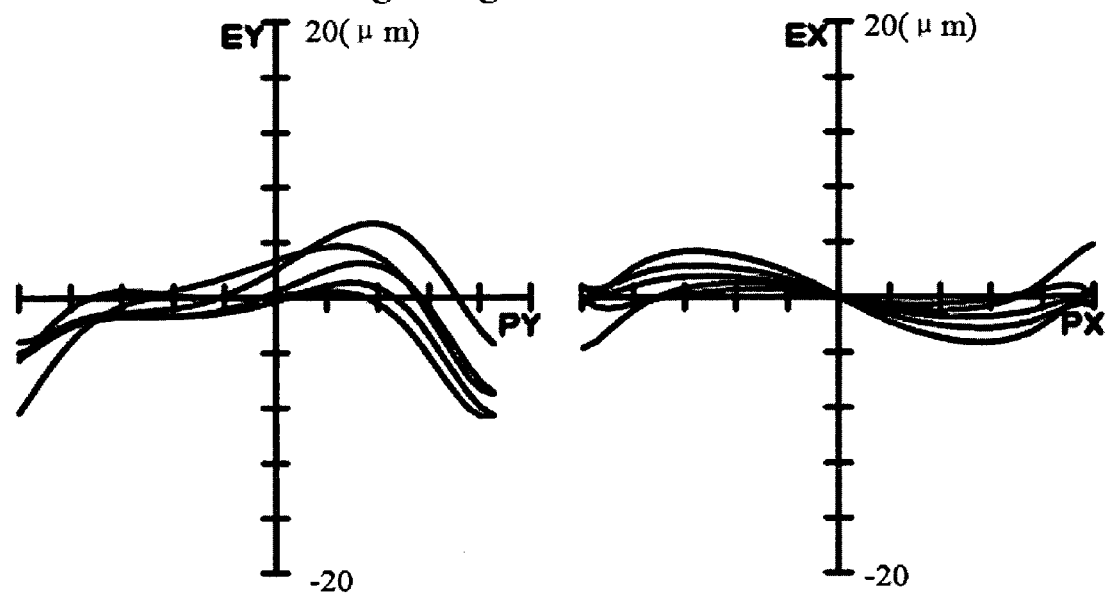
Figure 6C:
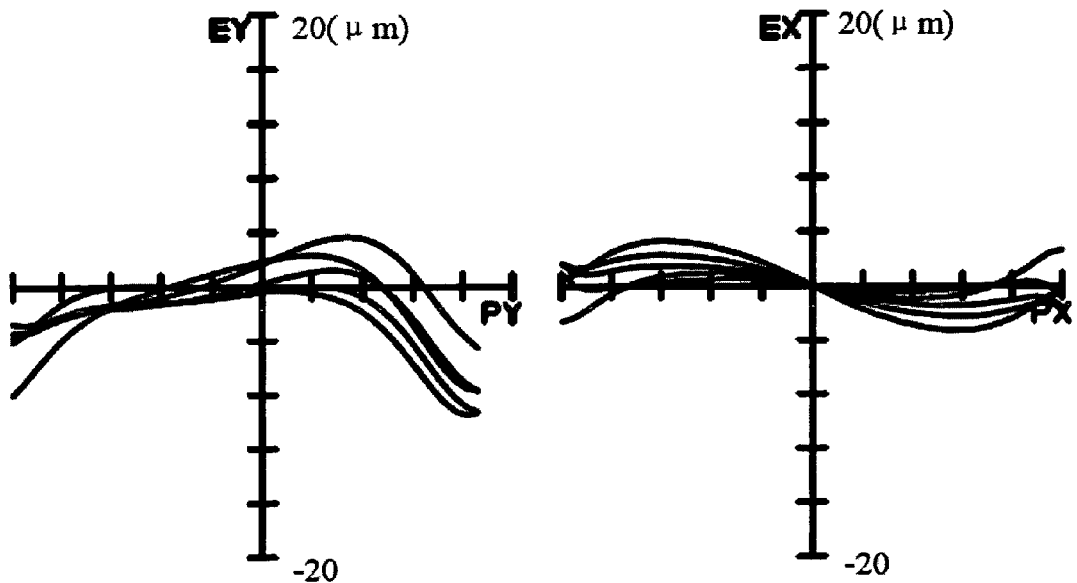
Figure 4:
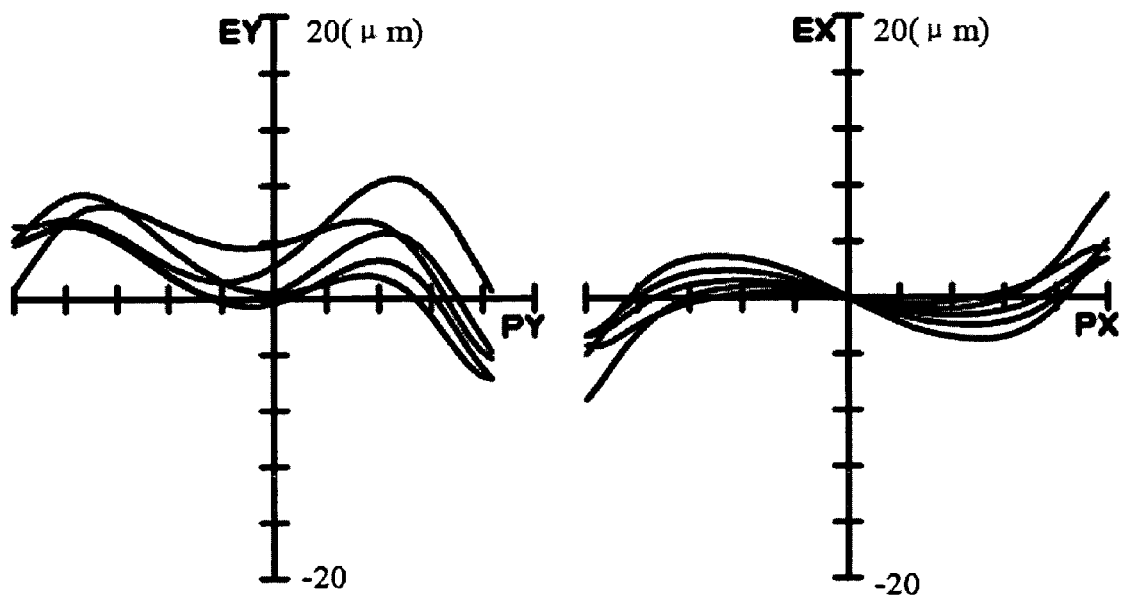
Figure 7A:
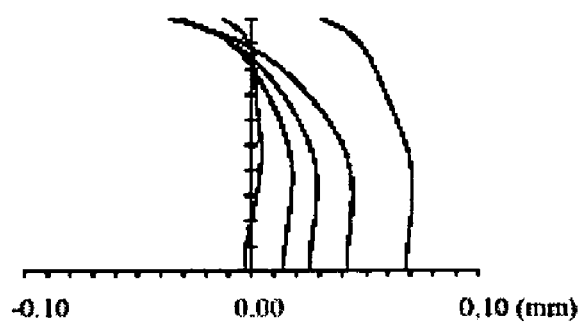
Figure 7B:
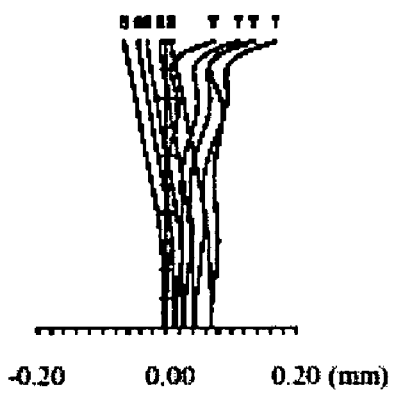
Figure 7B:
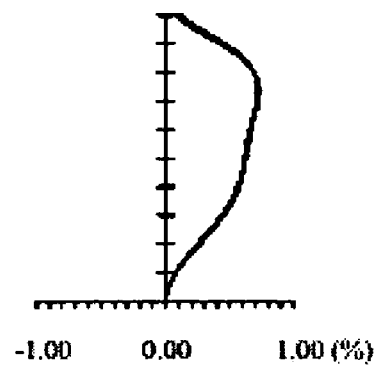
Figures 1, 7C:
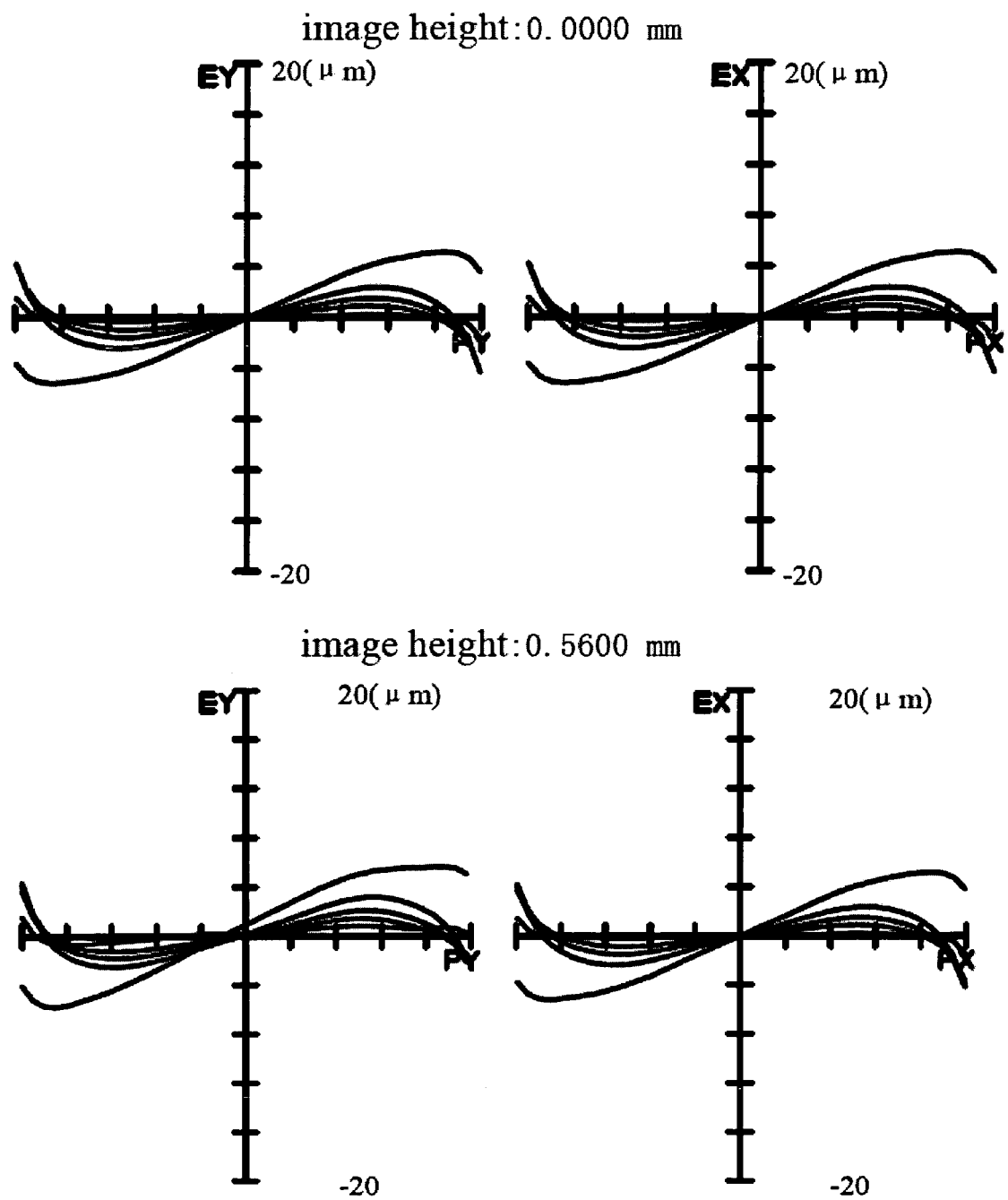
Figure 7C:
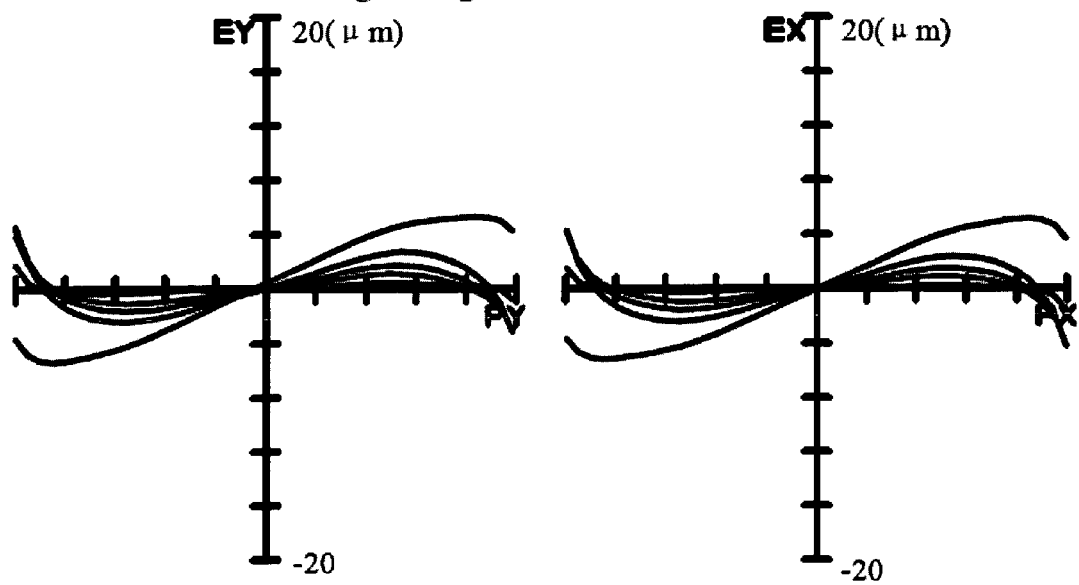
Figure 2:
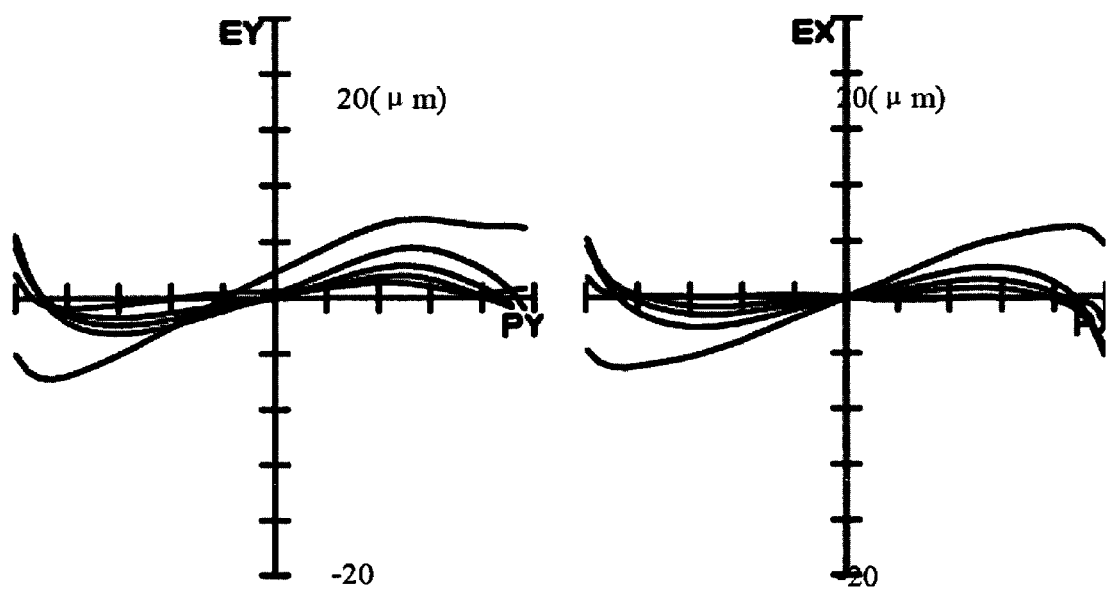
Figures 3, 7C:
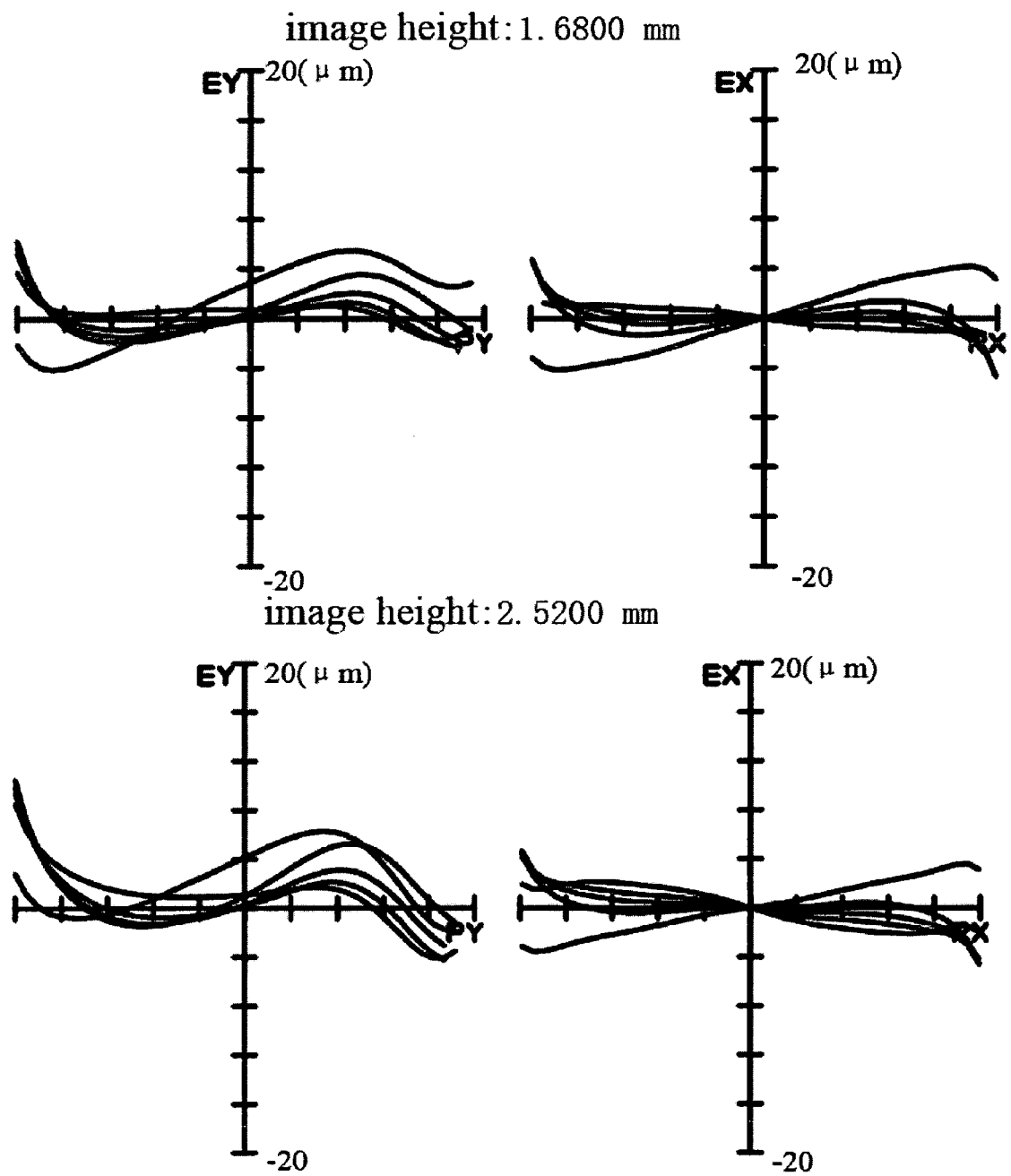
Figures 4, 7C:
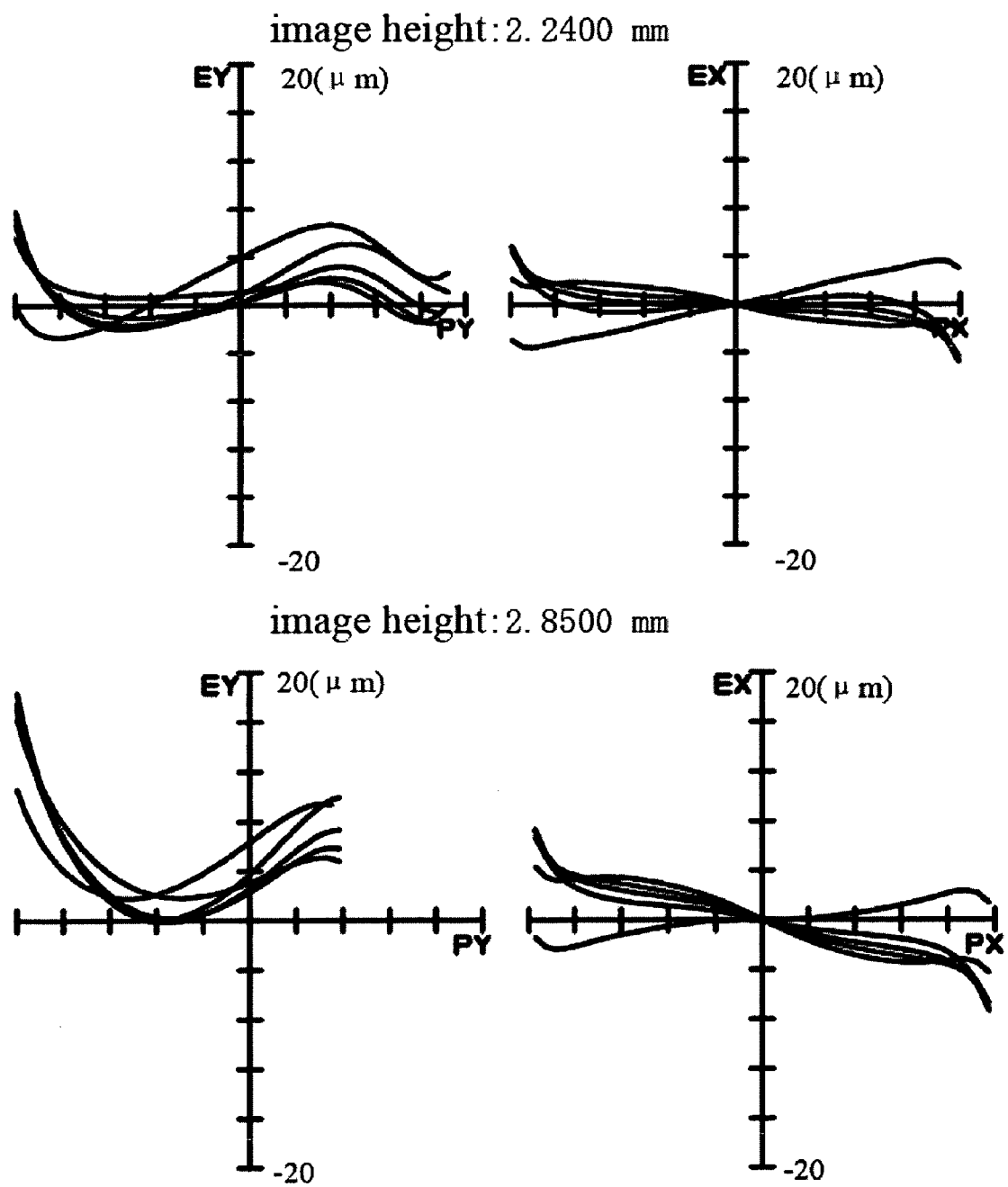
Figure 7D:
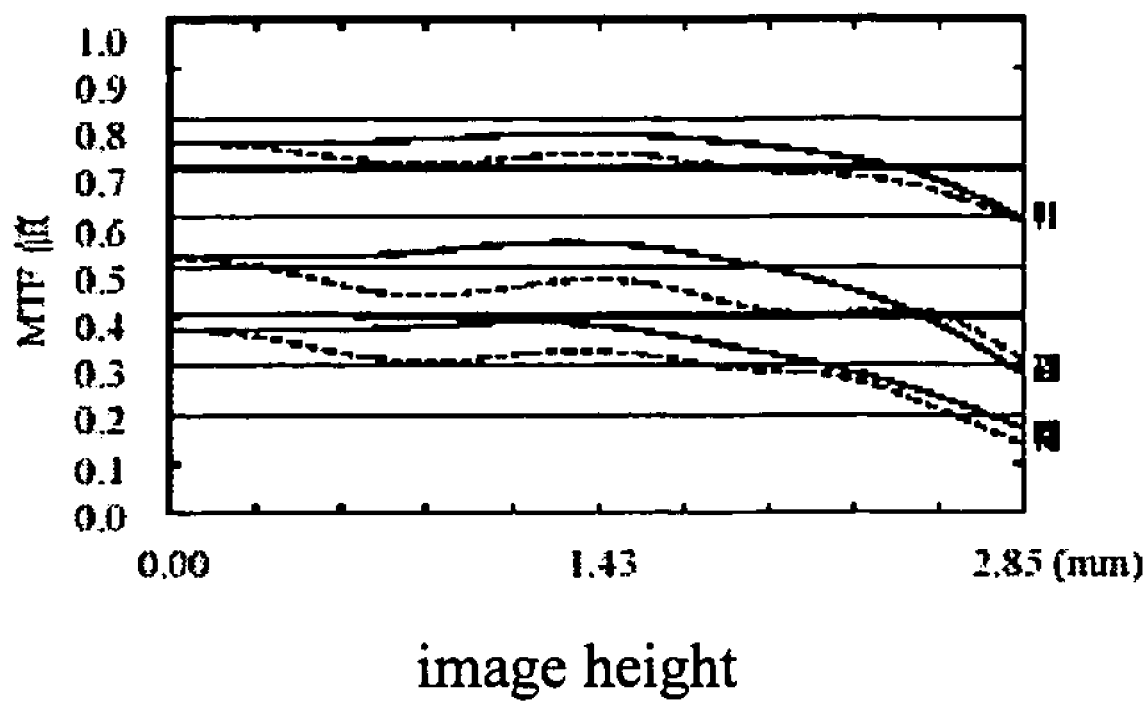

The second embodiment shows the design parameters for all lens surfaces from the object side of the first lens group G1 to the image side of the glass plate 17, wherein r9/r10=2.415/2.867=0.842, which is between 0.8 and 1.1. Abbe number (v1) of the material of the negative lens 11 of the first lens group G1 equals to 56.4 and Abbe number (v11) of the material of the positive lens 15 of the third lens group G3 equals to 56.4, both being greater than 55. Moreover, TT/SD=16.01/5.7=2.81<2.9. According to the above second embodiment, all possible aberrations of the lens system 10 of the present invention can be effectively corrected as shown in FIGS. 5a, 5b, 5c-1 to 5c-4, 5d, 6a, 6b, 6c-1 to 6c-4, 6d, 7a, 7b, 7c-1 to 7c-4 and 7d, wherein abscissa axis of FIGS. 5d, 6d, and 7d indicates image height, and ordinate axis indicates percentage value of MTF. And the S1 and T1, S2 and T2 as well as S3 and T3 curvature lines as shown respectively refer to the radial values (S) and the tangential values (T) thereof got when the spatial frequency thereof is respectively 60.0CY/MM 120.0CY/MM and 180.0CY/MM.

A third embodiment of the lens system 10 in accordance with the present invention presents the following data:

Focal value F = 4.568 (W) to 5.84 (M) to 8.733 (T)
Effective caliber FNO = 2.8 (W) to 3.3 (M) to 4.27 (T)

| No. of surface | Radius (mm) | Thickness (mm) | Refractivity (Nd) | Abbe No. (Vd) |
|---|---|---|---|---|
| 1 | −38.697 | 0.95 | 1.54258 | 56.8 |
| 2 | 3.275 | 0.4 | | |
| 3 | 4.614 | 1.2 | 1.58547 | 29.9 |
| 4 | 13.719 | 4.046 (W) to 2.73 (M) to 0.7 (T) | | |
| 5 | diaphragm | 0.23 | | |
| 6 | 3.302 | 0.07 | 1.5202 | 52.0 |
| 7 | 3.784 | 1.9 | 1.77248 | 49.6 |
| 8 | −1.93 | 0.5 | 1.5927 | 35.3 |
| 9 | 3.121 | 0.09 | 1.5202 | 52.0 |
| 10 | 3.007 | 1.45 (W) to 3.37 (M) to 6.27 (T) | | |
| 11 | −20.584 | 1.6 | 1.54258 | 56.8 |
| 12 | −4.234 | 2.554 (W) to 1.95 | | |

-continued

Focal value F = 4.568 (W) to 5.84 (M) to 8.733 (T)
Effective caliber FNO = 2.8 (W) to 3.3 (M) to 4.27 (T)

| No. of surface | Radius (mm) | Thickness (mm) | Refractivity (Nd) | Abbe No. (Vd) |
|---|---|---|---|---|
| | | (M) to 1.08 (T) | | |
| 13 | infinity | 0.81 | 1.51633 | 64.1 |
| 14 | infinity | 0.4 | | |

W: wide-angle position, M: intermediate position, and T: telephoto position

Date of the aspheric coefficients of the surfaces of the lens system 10 of the third embodiment are as follows:

Surface No. 1 (the object side surface of the negative lens 11 of the first lens group G1):
k=0,
A=−0.0036493558,
B=0.00061254777,
C=−5.6002906e−005,
D=0.2557195e−006, and
E=−9.0771504e−008;

Surface No. 2 (the image side surface of the negative lens 11 of the first lens group G1:
k=−2.0964,
A=0.00012917135,
B=0.00071191143,
C=−0.00011635957,
D=1.8366904e−005, and
E=−1.2054034e−006;

Surface No. 6 (the object side surface of the aspheric resin layer 131 of the second lens group G2):
k=−0.874241,
A=−0.0039232641,
B=−0.0007587636,
C=−0.00083108703,
D=0.00011079914, and
E=−2.7409939e−005;

Surface No. 10 (the image side surface of the aspheric resin layer 141 of the second lens group G2):
k=−1.734113,
A=0.021872116,
B=0.0027432303,
C=−0.0020945632,
D=0.0010466037, and
E=−0.00025407535;

Surface No. 11 (the object side surface of the positive lens 15 of the third lens group G3):
k=0,
A=−0.0025880216,
B=−0.0003949004,
C=0.00022292411,
D=−4.2700377e−005, and
E=2.5490021e−006; and Surface No. 12 (the image side surface of the positive lens 15 of the third lens group G3):
k=0.608113,
A=0.003960223,
B=−0.0015498673,
C=0.00046117825,
D=−5.7583367e−005, and
E=2.6952364e−006.

Figure 8A:
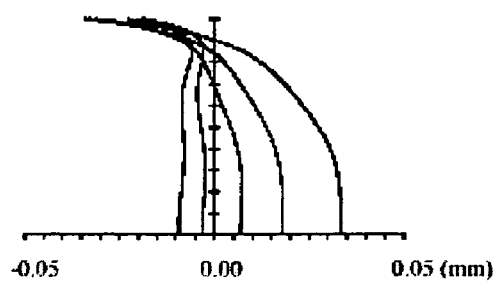
Figure 8B:
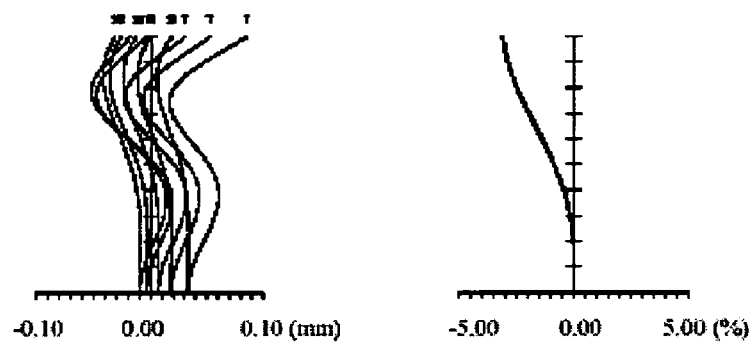
Figure 8D:
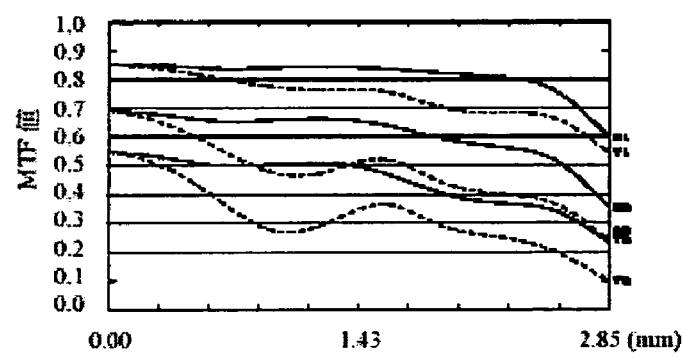
Figures 1, 8C:
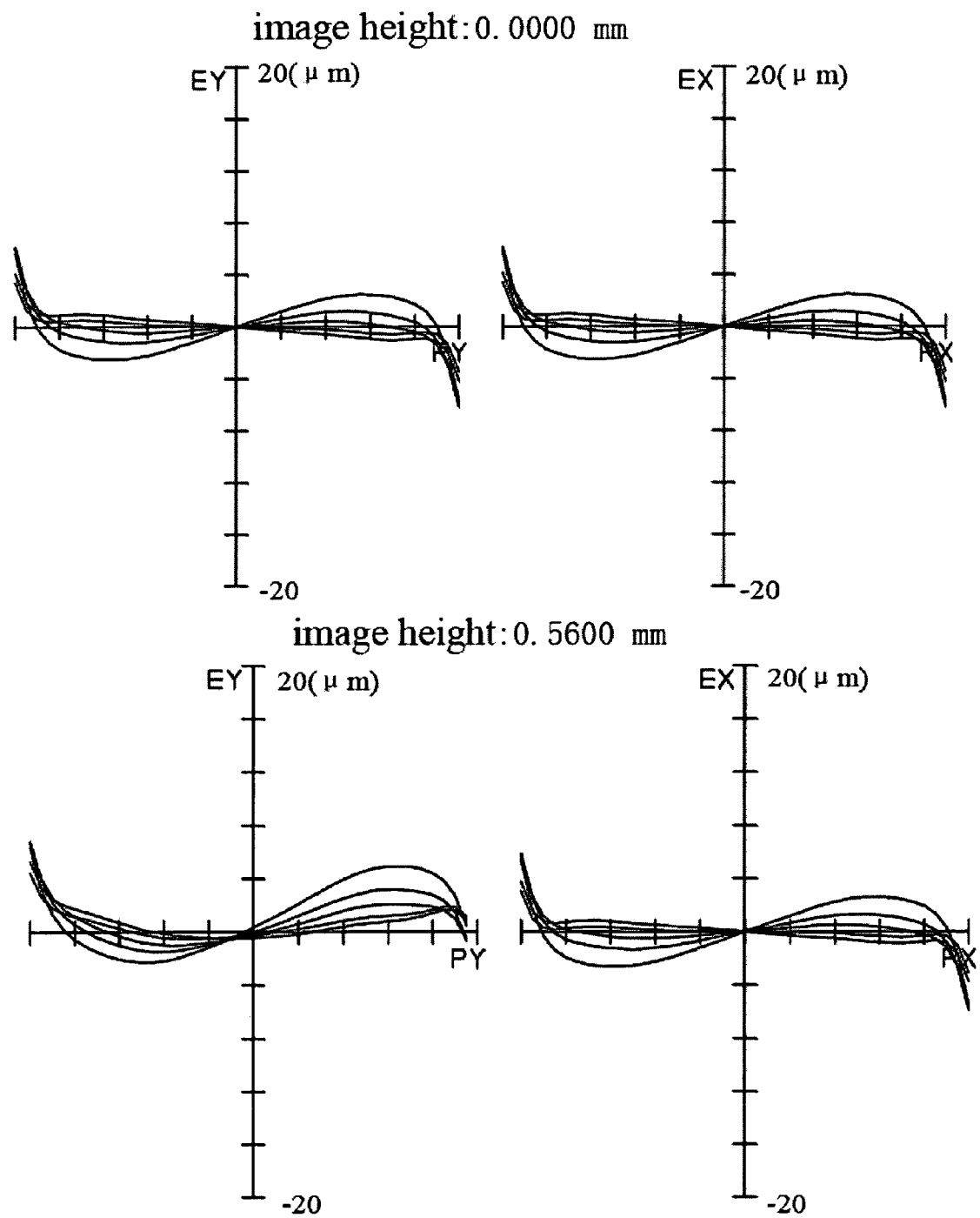
Figure 8C:
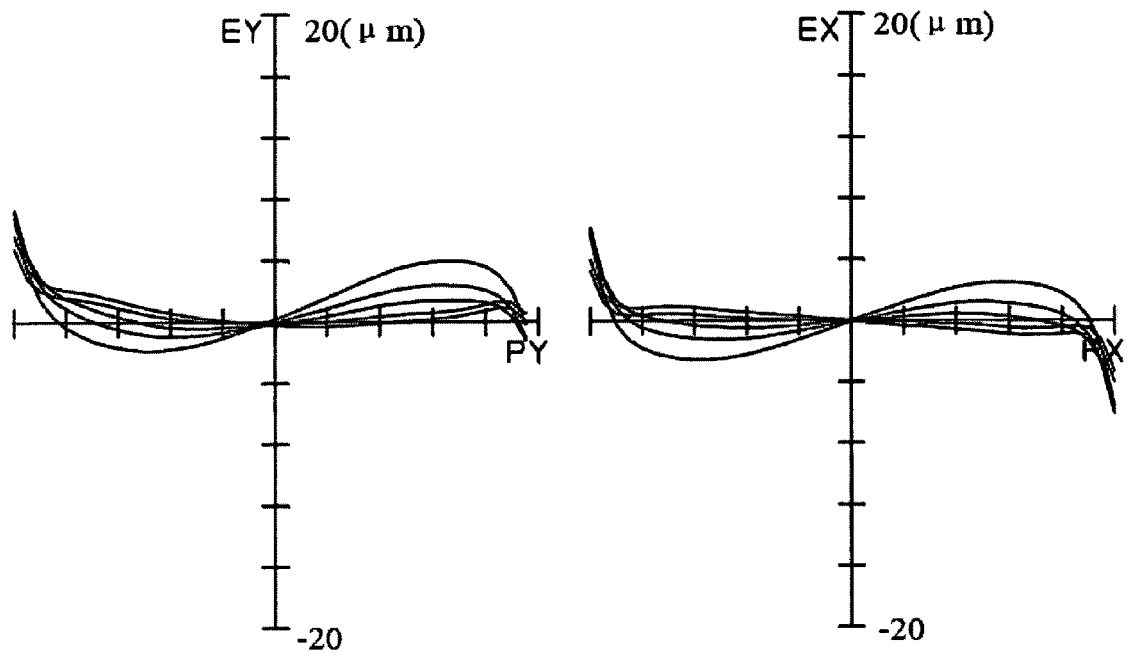
Figure 2:
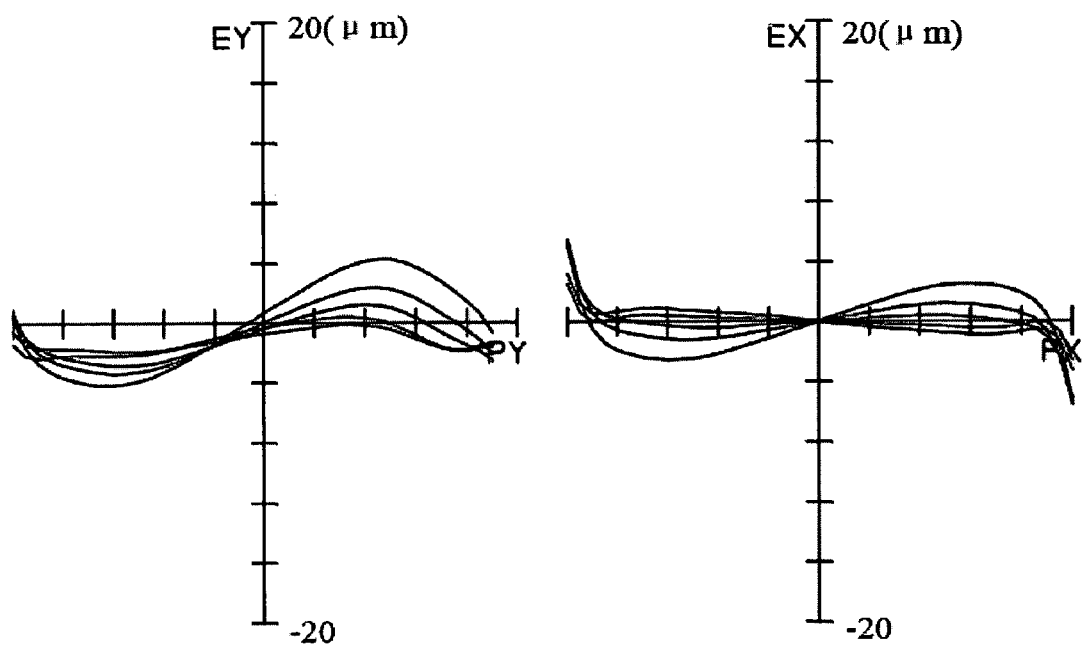
Figures 3, 8C:
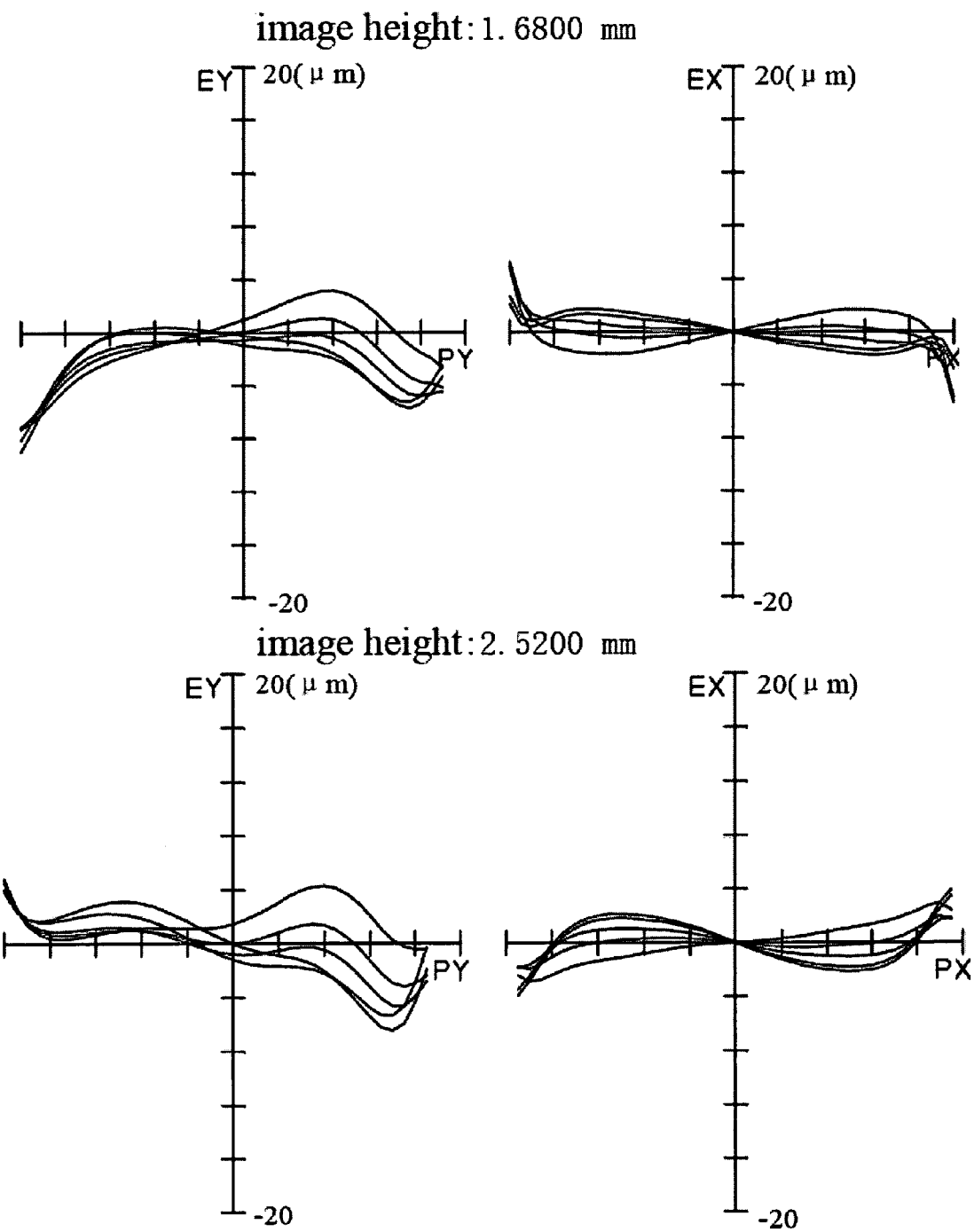
Figures 4, 8C:
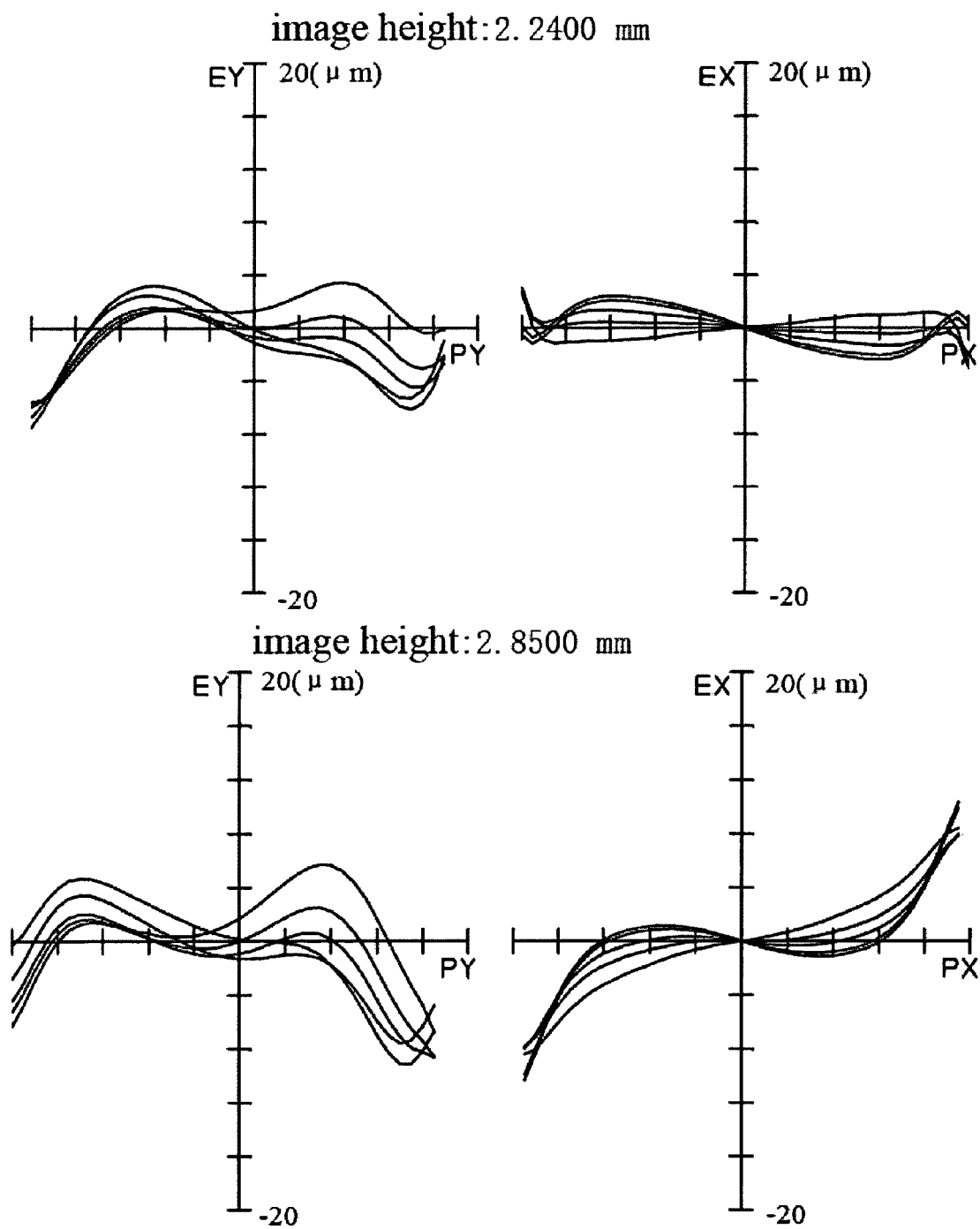
Figure 9A:
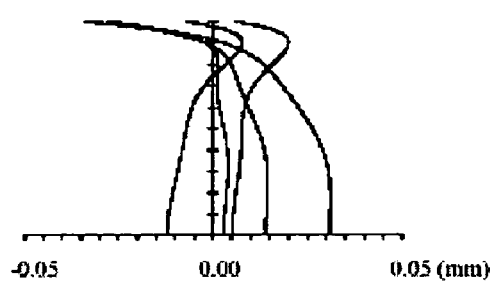
Figure 9B:
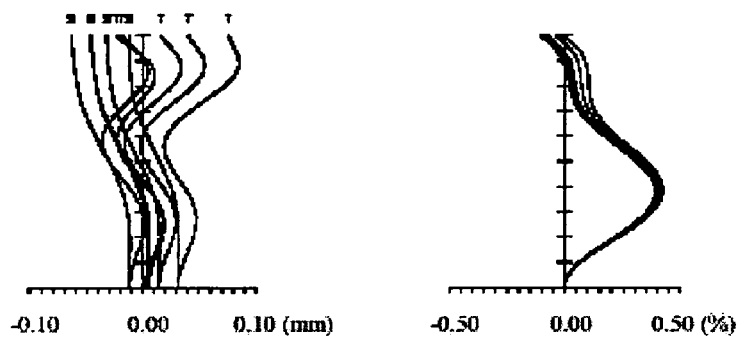
Figure 9D:
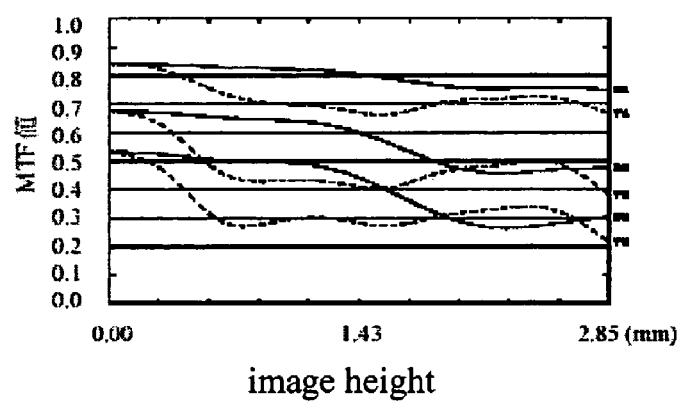
Figure 9C:
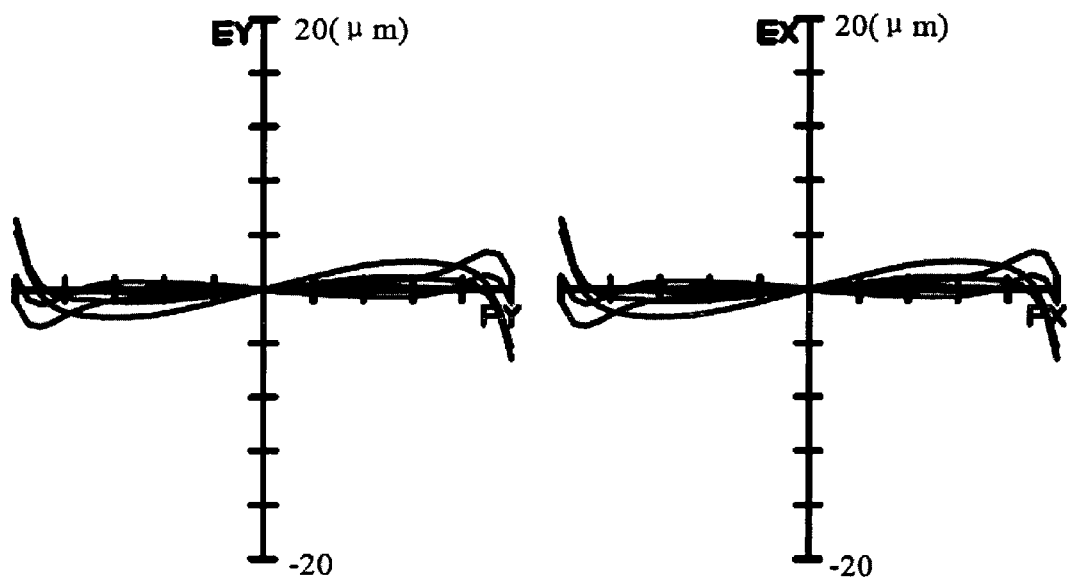
Figure 1:
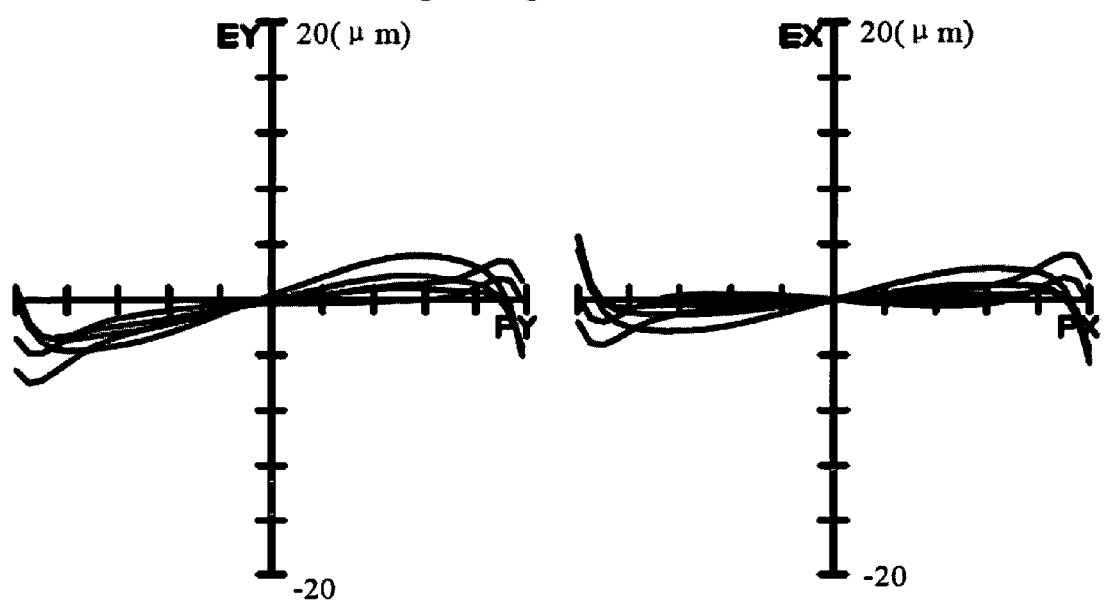
Figure 9C:
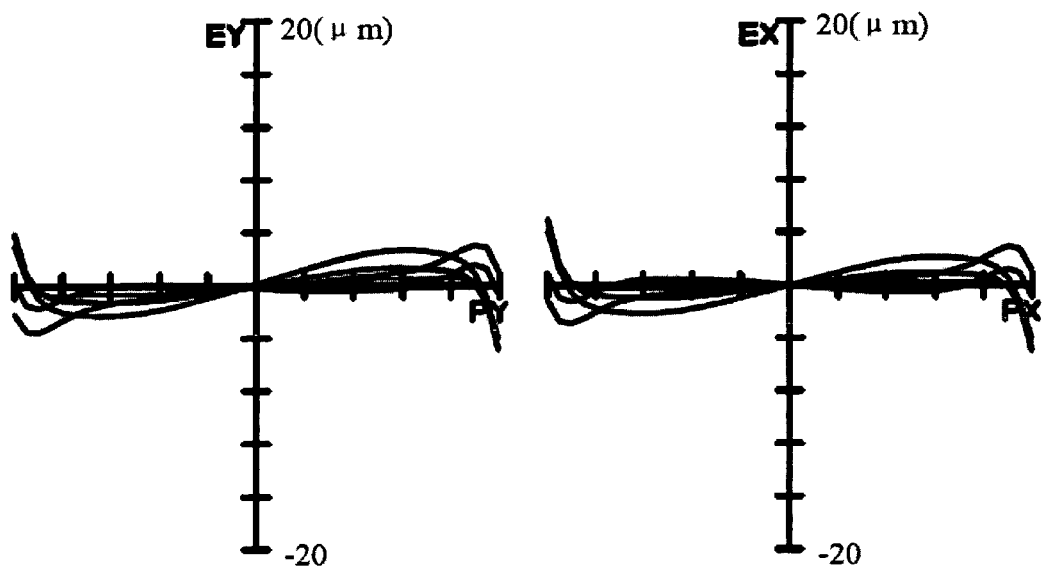
Figure 2:
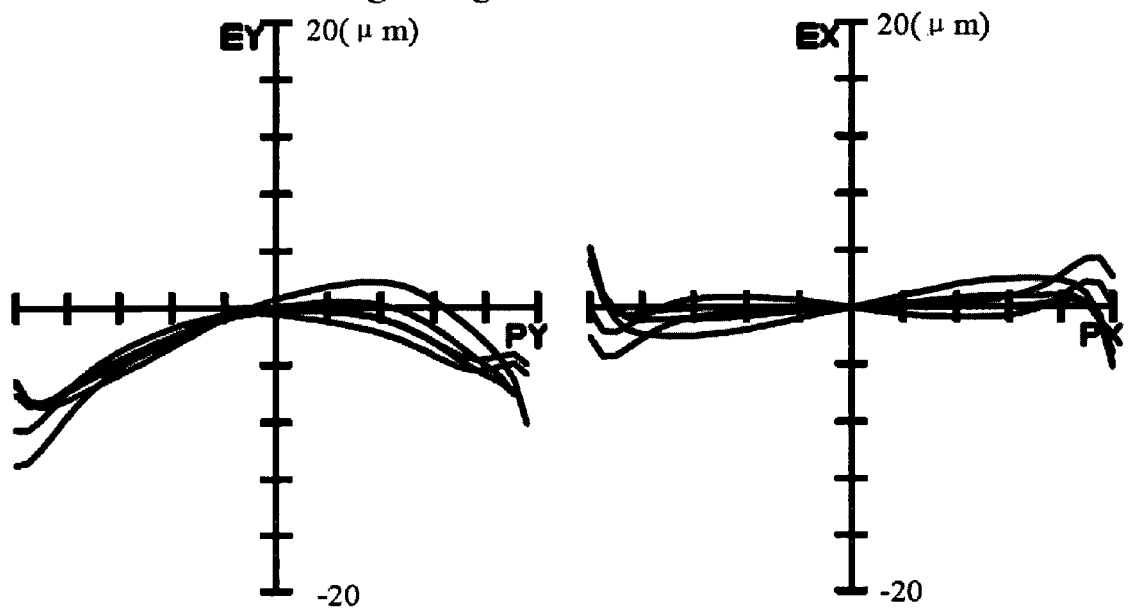
Figures 3, 9C:
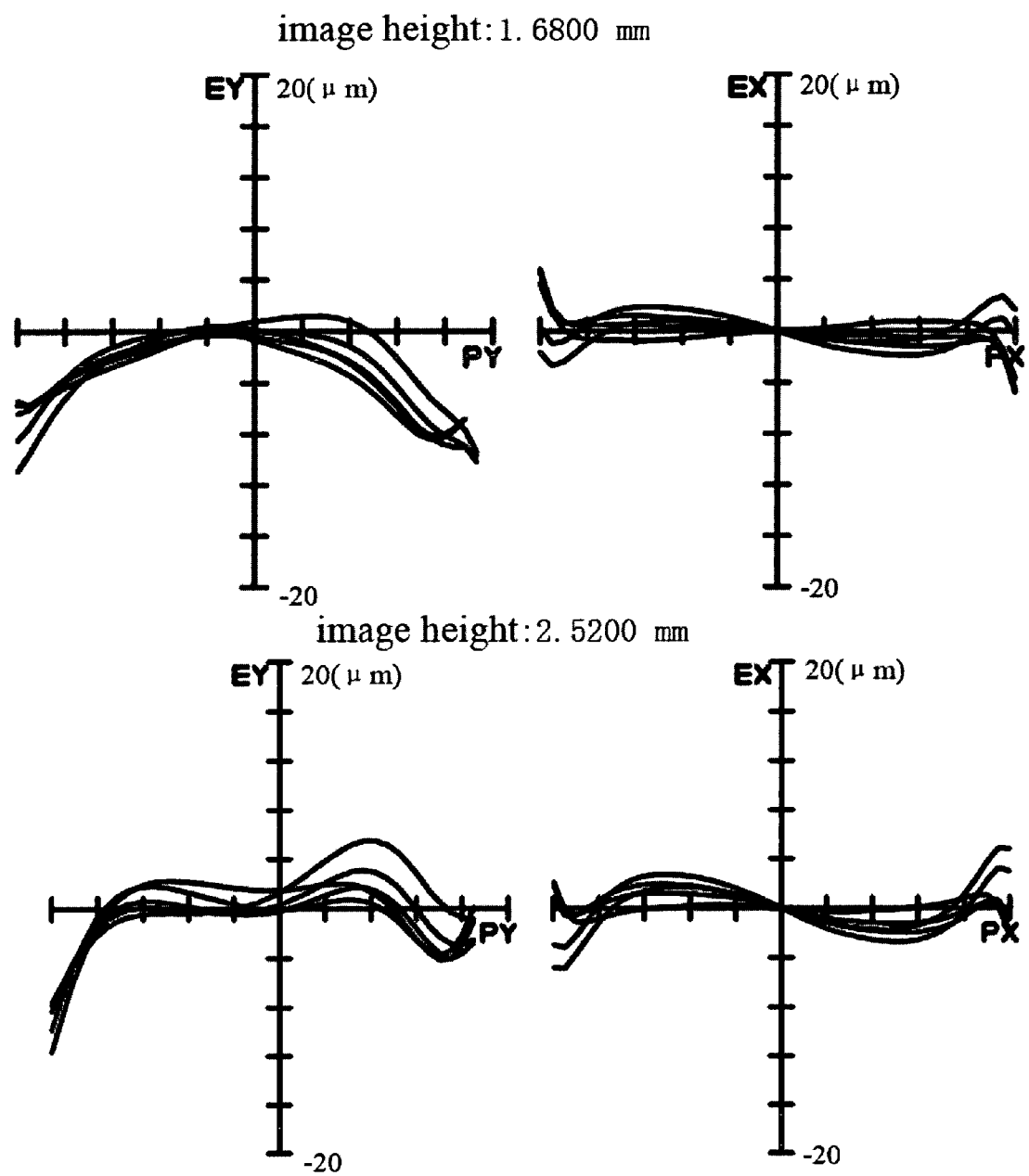
Figures 4, 9C:
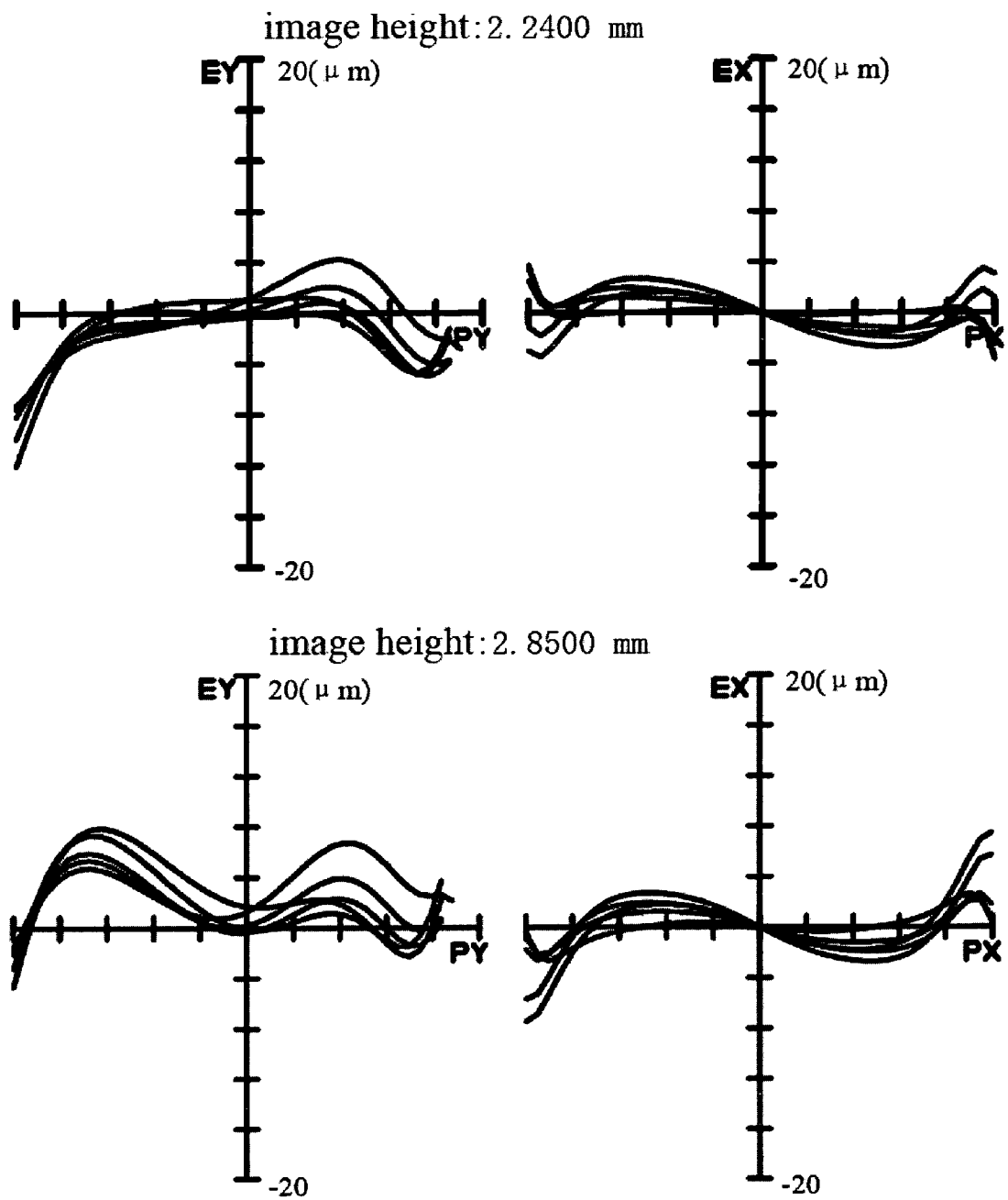
Figure 10A:
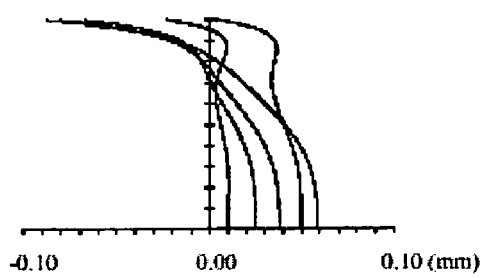
Figure 10B:
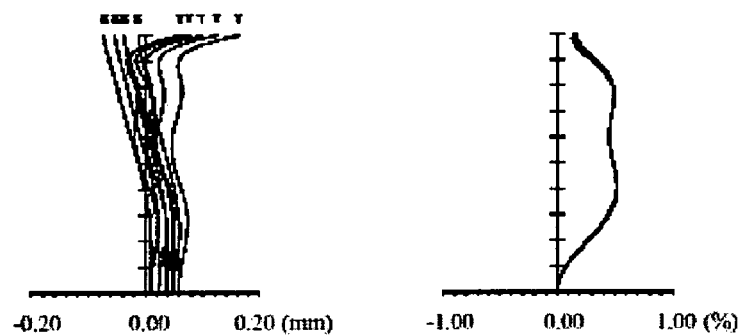
Figure 10D:
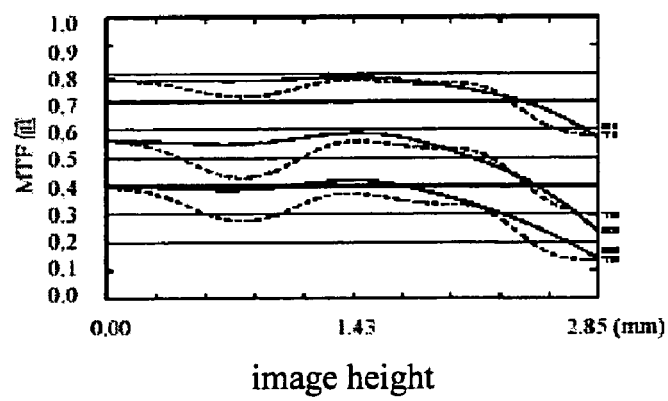
Figure 10C:
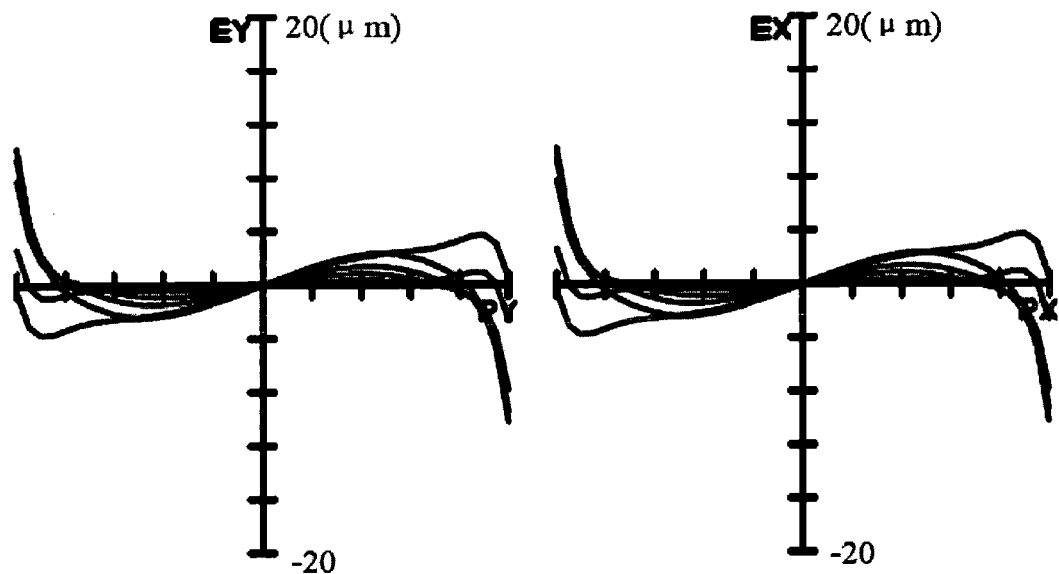
Figure 1:
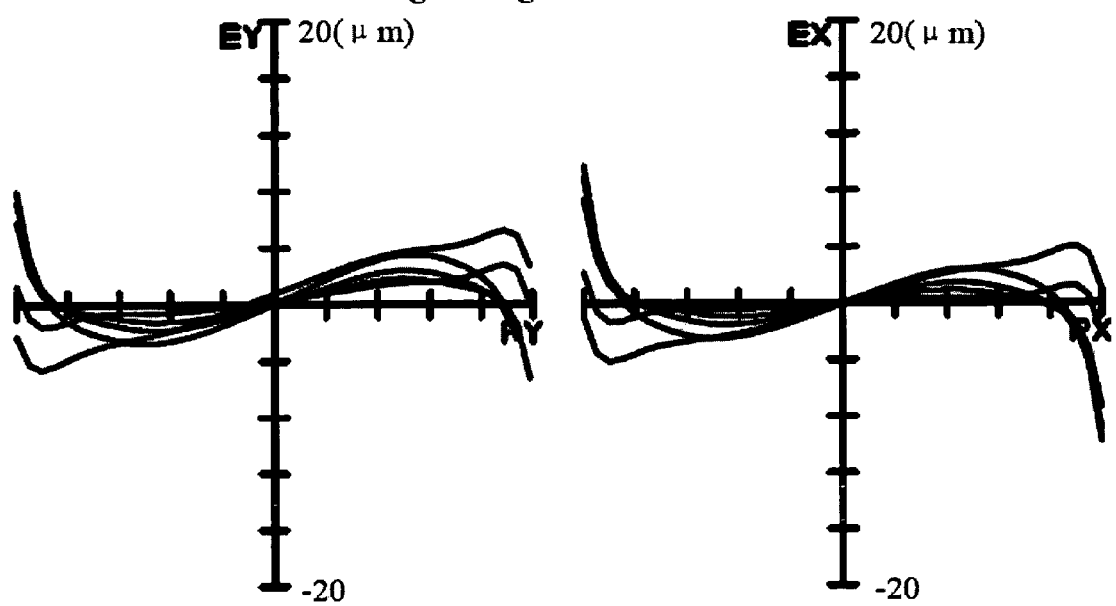
Figure 10C:
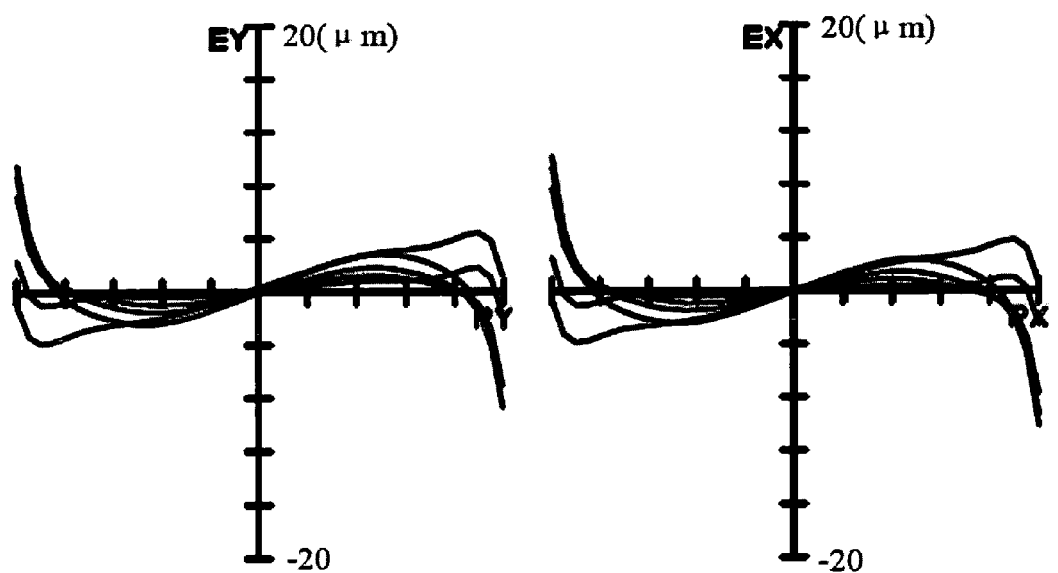
Figure 2:
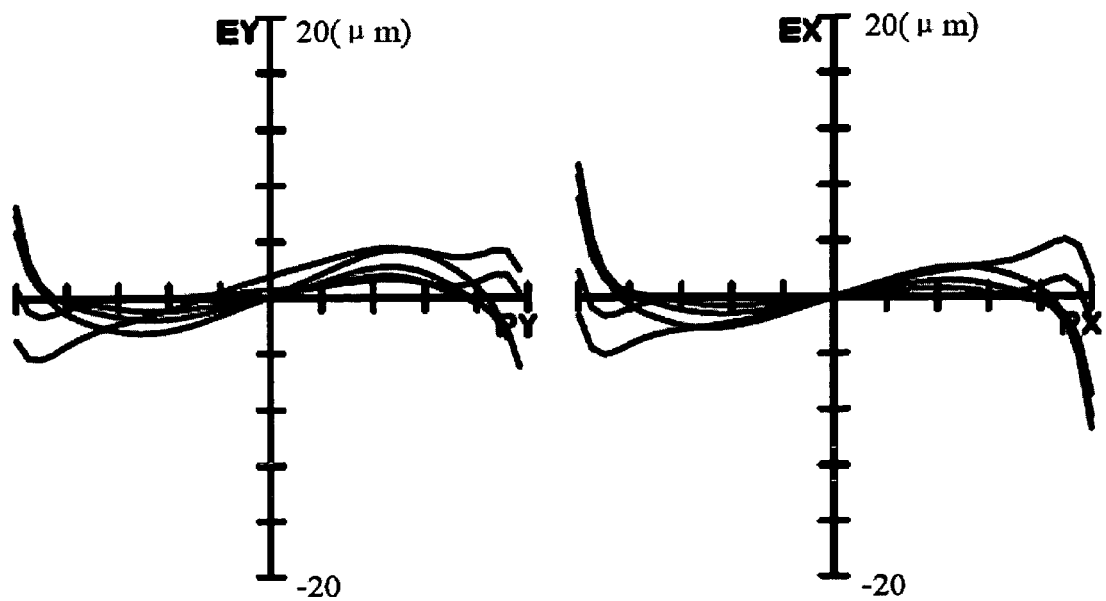
Figure 10C:
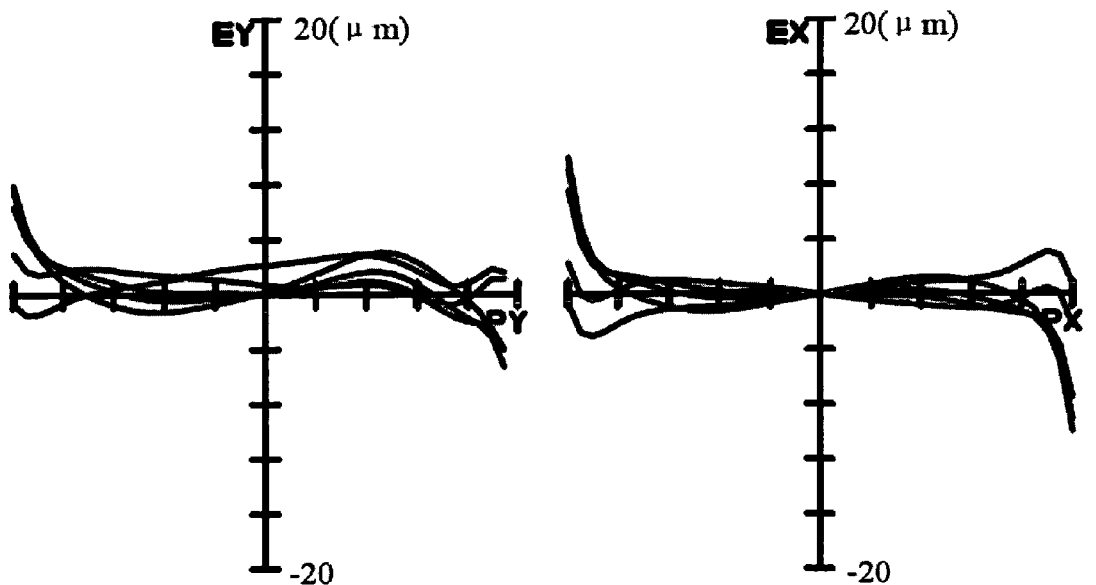
Figure 3:
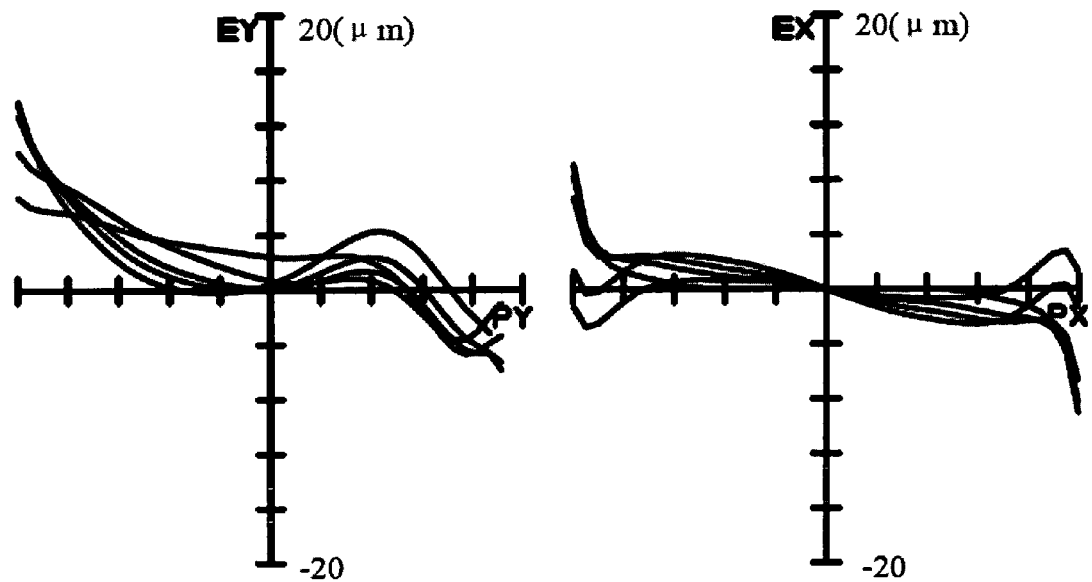
Figure 10C:
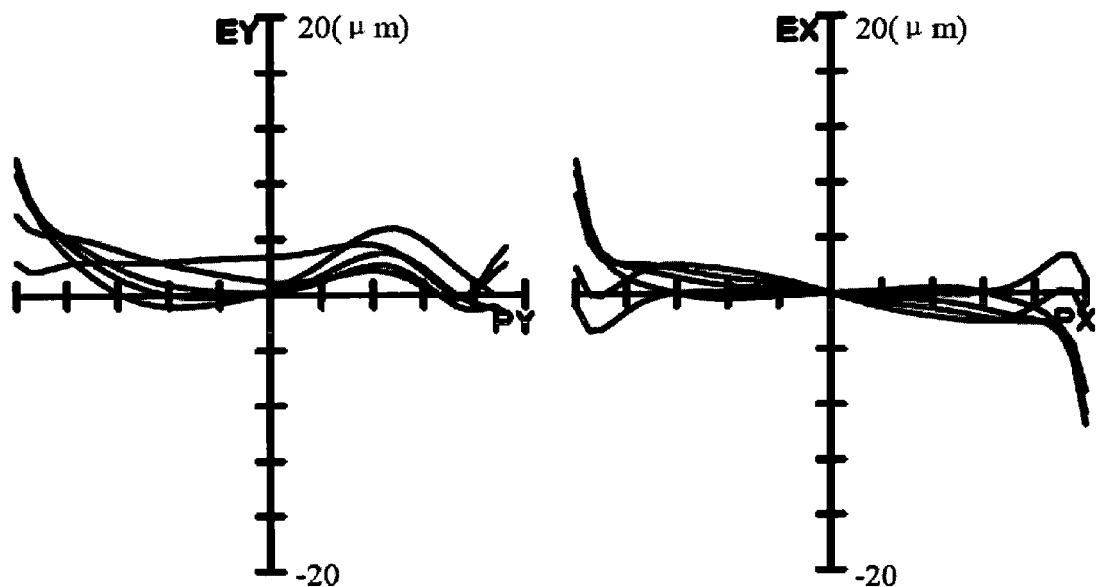
Figure 4:
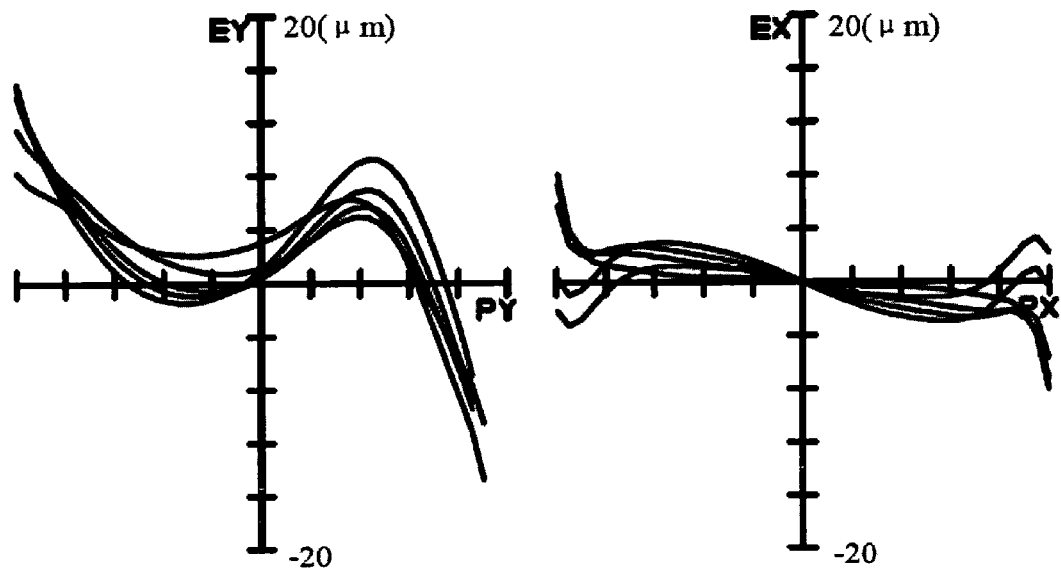

The third embodiment shows the design parameters for all lens surfaces from the object side of the first lens group G1 to the image side of the glass plate 17, wherein r9/r10=3.121/3.007=1.04, which is between 0.8 and 1.1. Abbe number (v1) of the material of the negative lens 11 of the first lens group G1 equals to 56.8 and Abbe number (v11) of the material of the positive lens 15 of the third lens group G3 equals to 56.8, both being greater than 55. Moreover, TT/SD=16.2/5.7=2.84<2.9. According to the above third embodiment, all possible aberrations of the lens system 10 of the present invention can be effectively corrected as shown in FIGS. 8*a*,8*b*, 8*c*-1 to 8*c*-4, 8*d*, 9*a*,9*b*, 9*c*-1 to 9*c*-4, 9*d*, 10*a*, 10*b*, 10*c*-4 and 10*d*, wherein the abscissa axis of FIGS. 8*d*, 9*d*, and 10*d* indicates image height, and ordinate axis indicates percentage value of MTF. And the S1 and T1, S2 and T2 as well as S3 and T3 curvature lines as shown respectively refer to the radial values (S) and the tangential values (T) thereof got when the spatial frequency thereof is respectively 60.0CY/MM 120.0CY/MM and 180.0CY/MM.

It is to be understood, however, that even though numerous characteristics and advantages of the present invention have been set forth in the foregoing description, together with details of the structure and function of the invention, the disclosure is illustrative only, and changes may be made in detail, especially in matters of material, plating method and manufacturing process within the principles of the invention to the full extent indicated by the broad general meaning of the terms in which the appended claims are expressed.

What is claimed is:

1. A lens system in an imaging device, comprising, in sequence from an object side to an image side:
   a first lens group having negative refractive power, and comprising a plurality of lenses, among which one lens is made of resin material and has an Abbe number greater than 55;
   a second lens group having positive refractive power, and comprising first and second lenses cemented together to form a composite lens having an object side and an image side on both of which aspheric resin layers are formed, ratio between radius of curvature of an object side of the aspheric resin layer on the image side of the composite lens and radius of curvature of the image side of the said aspheric resin layer being between 0.8 and 1.1; and
   a third lens group having positive refractive power, and comprising a positive lens made of resin material with Abbe number greater than 55;
   wherein in zooming, the first lens group remains stationary, and when performing from a wide-angle end to a telephoto end, the second lens group moves away from an image plane, while the third lens group moves toward the image plane, whereby distance between the first and second lens groups is decreased while distance between the second and third lens groups is increased.

2. The lens system as claimed in claim 1 further comprising a diaphragm member arranged near the object side of the second lens group, the diaphragm member being movable with the second lens group.

3. The lens system as claimed in claim 1, wherein the first lens group comprises a negative lens close to the object side and a positive lens close to the image side, the negative lens being made of resin material.

4. The lens system as claimed in claim 3, wherein the composite lens of the second lens group is made of glass.

5. The lens system as claimed in claim 4, wherein the composite lens is composed of a positive lens and a negative lens.

6. The lens system as claimed in claim 5 further comprising a glass plate set between the image plane and the third lens group.

7. The lens system as claimed in claim 1 further comprising a glass plate set between the image plane and the third lens group.

8. The lens system as claimed in claim 1, wherein ratio between a total length calculated from the object side surface of the first lens group to the image plane and a diagonal length of a sensor used in the imaging device is less than 2.9.

9. A lens system in an imaging device, comprising, in sequence from an object side to an image side, a first lens group having negative refractive power; a second lens group having positive refractive power, which comprises first and second lenses cemented together to form a composite lens with aspheric resin layers formed an object side and an image side thereof; and a third lens group having positive refractive power; wherein in zooming, the first lens group remains stationary, and when performing from a wide-angle end to a telephoto end, the second lens group moves away from an image plane, while the third lens group moves toward the image plane, whereby distance between the first and second lens groups is decreased, while distance between the second and third lens groups is increased; wherein ratio between a total length calculated from the object side surface of the first lens group to the image plane and a diagonal length of a sensor used in the imaging device is less than 2.9, and wherein ratio between radius of curvature of an object side of the aspheric resin layer on the image side of the composite lens and radius of curvature of the image side of the said aspheric resin layer is between 0.8 and 1.1.

10. The lens system as claimed in claim 9, wherein the first lens group comprises a plurality of lenses, among which one lens is made of resin material and has an Abbe number greater than 55.

11. The lens system as claimed in claim 9, wherein the third lens group comprises a positive lens made of resin material with Abbe number greater than 55.

12. The lens system as claimed in claim 9 further comprising a diaphragm member arranged near the object side of the second lens group, the diaphragm member being movable with the second lens group.

13. The lens system as claimed in claim 11 further comprising a diaphragm member arranged near the object side of the second lens group, the diaphragm member being movable with the second lens group.

14. The lens system as claimed in claim 13, wherein the first lens group comprises a negative lens close to the object side and a positive lens close to the image side, the negative lens being made of resin material.

15. The lens system as claimed in claim 14, wherein the composite lens of the second lens group is made of glass.

16. The lens system as claimed in claim 15, wherein the composite lens is composed of a positive lens and a negative lens.

17. The lens system as claimed in claim 16 further comprising a glass plate set between the image plane and the third lens group.

* * * * *